US006246257B1

(12) United States Patent
Kawahara

(10) Patent No.: US 6,246,257 B1
(45) Date of Patent: Jun. 12, 2001

(54) FIFO CIRCUIT

(75) Inventor: Hiroyuki Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/543,941

(22) Filed: Apr. 6, 2000

(30) Foreign Application Priority Data

Jul. 29, 1999 (JP) ................................. 11-215602

(51) Int. Cl.[7] ............................... H03K 19/173
(52) U.S. Cl. .................. 326/38; 326/38; 365/189.12; 365/220; 365/221; 395/872; 395/877; 395/878
(58) Field of Search ........................... 365/189.12, 220, 365/221; 326/38; 711/120; 395/872, 877, 878

(56) References Cited

U.S. PATENT DOCUMENTS 5,809,557 * 9/1998 Shemla et al. .................. 711/173
5,884,099 * 3/1999 Klingelhofer .................. 395/872
6,044,030 * 3/2000 Zheng et al. .................. 365/221
6,052,330 * 4/2000 Tanabe .................. 365/233

FOREIGN PATENT DOCUMENTS 5-63673   3/1993 (JP).
5-314758 11/1993 (JP).

* cited by examiner

Primary Examiner—Michael Tokar
Assistant Examiner—Vibol Tan
(74) Attorney, Agent, or Firm—Helfgott & Karas, P C.

(57) ABSTRACT

A FIFO circuit with a reduced number of buffers connected to output ports and thereby lowering parasitic capacitance. The FIFO circuit includes an input register for storing data therein supplied from a plurality of input ports. A shifter rearranges the data supplied from the input register and a shift register stores therein and shifts the data supplied from the shifter. A selector circuit selects either the data from the input register or the data from the shift register such that valid data fill places from a least significant side of the output ports. A control circuit controls the input register, the shift register, the shifter, and the selector circuit.

18 Claims, 20 Drawing Sheets

FIG. 3A — MODE #0, #4 (VALID DATA POSITION = 5, 6, 7, 8)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 5 | 6 | 7 | 8 | D0 | D1 | D2 | D3 | 5 | 6 | 7 | 8 | 0 |
| 1000 | 6 | 7 | 8 | 4 | D0 | D1 | D2 | D3 | 5 | 6 | 7 | 8 | 0 |
| 1100 | 7 | 8 | 3 | 4 | D0 | D1 | D2 | D3 | 5 | 6 | 7 | 8 | 0 |
| 1110 | 8 | 2 | 3 | 4 | D0 | D1 | D2 | D3 | 5 | 6 | 7 | 8 | 0 |
| 1111 | 1 | 2 | 3 | 4 | D0 | D1 | D2 | D3 | 5 | 6 | 7 | 8 | 0 |

FIG. 3B — MODE #1 (VALID DATA POSITION = 1)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 1 | 5 | 6 | 7 | D0 | D1 | D2 | D3 | 1 | 5 | 6 | 7 | 0 |
| 1000 | 5 | 6 | 7 | 8 | D0 | D1 | D2 | D3 | 1 | 5 | 6 | 7 | 0 |
| 1100 | 6 | 7 | 8 | 4 | D0 | D1 | D2 | D3 | 1 | 5 | 6 | 7 | 0 |
| 1110 | 7 | 8 | 3 | 4 | D0 | D1 | D2 | D3 | 1 | 5 | 6 | 7 | 0 |
| 1111 | 8 | 2 | 3 | 4 | D0 | D1 | D2 | D3 | 1 | 5 | 6 | 7 | 0 |

FIG. 3C — MODE #2 (VALID DATA POSITION = 1, 2)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 1 | 2 | 5 | 6 | D0 | D1 | D2 | D3 | 1 | 2 | 5 | 6 | 0 |
| 1000 | 2 | 5 | 6 | 7 | D0 | D1 | D2 | D3 | 1 | 2 | 5 | 6 | 0 |
| 1100 | 5 | 6 | 7 | 8 | D0 | D1 | D2 | D3 | 1 | 2 | 5 | 6 | 0 |
| 1110 | 6 | 7 | 8 | 4 | D0 | D1 | D2 | D3 | 1 | 2 | 5 | 6 | 0 |
| 1111 | 7 | 8 | 3 | 4 | D0 | D1 | D2 | D3 | 1 | 2 | 5 | 6 | 0 |

FIG. 3D — MODE #3 (VALID DATA POSITION = 1, 2, 3)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 1 | 2 | 3 | 5 | D0 | D1 | D2 | D3 | 1 | 2 | 3 | 5 | 0 |
| 1000 | 2 | 3 | 5 | 6 | D0 | D1 | D2 | D3 | 1 | 2 | 3 | 5 | 0 |
| 1100 | 3 | 5 | 6 | 7 | D0 | D1 | D2 | D3 | 1 | 2 | 3 | 5 | 0 |
| 1110 | 5 | 6 | 7 | 8 | D0 | D1 | D2 | D3 | 1 | 2 | 3 | 5 | 0 |
| 1111 | 6 | 7 | 8 | 4 | D0 | D1 | D2 | D3 | 1 | 2 | 3 | 5 | 0 |

FIG. 3E — MODE #4 (VALID DATA POSITION = 1, 2, 3, 4)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 1 | 2 | 3 | 4 | D0 | D1 | D2 | D3 | 1 | 2 | 3 | 4 | 0 |
| 1000 | 2 | 3 | 4 | 5 | D0 | D1 | D2 | D3 | 1 | 2 | 3 | 4 | 0 |
| 1100 | 3 | 4 | 5 | 6 | D0 | D1 | D2 | D3 | 1 | 2 | 3 | 4 | 0 |
| 1110 | 4 | 5 | 6 | 7 | D0 | D1 | D2 | D3 | 1 | 2 | 3 | 4 | 0 |
| 1111 | 5 | 6 | 7 | 8 | D0 | D1 | D2 | D3 | 1 | 2 | 3 | 4 | 0 |

FIG. 3F — MODE #5 (VALID DATA POSITION = 1, 2, 3, 4, 8)

| S0 | 1 | 2 | 3 | 4 | 5 | 6 | 7 | 8 | D0 | D1 | D2 | D3 | FF |
|------|---|---|---|---|----|----|----|----|----|----|----|----|----|
| 0000 | 1 | 2 | 3 | 4 | D0 | D1 | D2 | D3 | 1 | 2 | 3 | 4 | 1 |
| 1000 | 2 | 3 | 4 | 8 | D0 | D1 | D2 | D3 | 1 | 2 | 3 | 4 | 0 |
| 1100 | 3 | 4 | 8 | 5 | D0 | D1 | D2 | D3 | 1 | 2 | 3 | 4 | 0 |
| 1110 | 4 | 8 | 5 | 6 | D0 | D1 | D2 | D3 | 1 | 2 | 3 | 4 | 0 |
| 1111 | 8 | 5 | 6 | 7 | D0 | D1 | D2 | D3 | 1 | 2 | 3 | 4 | 0 |

MODE #6 (VALID DATA POSITION = 1,2,3,4,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | DI1 | 7 | 8 | 1 | 2 | 3 | 4 | 1 |
| 1000 | 2 | 3 | 4 | 5 | DI0 | DI1 | DI2 | 8 | 1 | 2 | 3 | 4 | 1 |
| 1100 | 3 | 4 | 7 | 8 | DI0 | DI1 | DI2 | DI3 | 1 | 2 | 3 | 4 | 1 |
| 1110 | 4 | 7 | 8 | 5 | DI0 | DI1 | DI2 | DI3 | 1 | 2 | 3 | 4 | 0 |
| 1111 | 7 | 8 | 5 | 6 | DI0 | DI1 | DI2 | DI3 | 1 | 2 | 3 | 4 | 0 |

FIG. 4A

MODE #7 (VALID DATA POSITION = 1,2,3,4,6,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | 6 | 7 | 8 | 1 | 2 | 3 | 4 | 1 |
| 1000 | 2 | 3 | 4 | 6 | DI0 | DI1 | 7 | 8 | 1 | 2 | 3 | 4 | 1 |
| 1100 | 3 | 4 | 6 | 7 | DI0 | DI1 | DI2 | 8 | 1 | 2 | 3 | 4 | 1 |
| 1110 | 4 | 6 | 7 | 8 | DI0 | DI1 | DI2 | DI3 | 1 | 2 | 3 | 4 | 0 |
| 1111 | 6 | 7 | 8 | 5 | DI0 | DI1 | DI2 | DI3 | 1 | 2 | 3 | 4 | 0 |

FIG. 4B

MODE #8 (VALID DATA POSITION = 1,2,3,4,5,6,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | 5 | 6 | 7 | 8 | 1 | 2 | 3 | 4 | 1 |
| 1000 | 2 | 3 | 4 | 5 | DI0 | 6 | 7 | 8 | 1 | 2 | 3 | 4 | 1 |
| 1100 | 3 | 4 | 5 | 6 | DI0 | DI1 | 7 | 8 | 1 | 2 | 3 | 4 | 1 |
| 1110 | 4 | 5 | 6 | 7 | DI0 | DI1 | DI2 | 8 | 1 | 2 | 3 | 4 | 1 |
| 1111 | 5 | 6 | 7 | 8 | DI0 | DI1 | DI2 | DI3 | 1 | 2 | 3 | 4 | 0 |

FIG. 4C

MODE #5 (VALID DATA POSITION = 1,5,6,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 5 | 6 | 7 | DI0 | DI1 | DI2 | 8 | 1 | 5 | 6 | 7 | 1 |
| 1000 | 5 | 6 | 7 | 8 | DI0 | DI1 | DI2 | DI3 | 1 | 5 | 6 | 7 | 1 |
| 1100 | 6 | 7 | 8 | 3 | DI0 | DI1 | DI2 | DI3 | 1 | 5 | 6 | 7 | 0 |
| 1110 | 7 | 8 | 3 | 4 | DI0 | DI1 | DI2 | DI3 | 1 | 5 | 6 | 7 | 0 |
| 1111 | 8 | 2 | 3 | 4 | DI0 | DI1 | DI2 | DI3 | 1 | 5 | 6 | 7 | 0 |

FIG. 4D

MODE #6 (VALID DATA POSITION = 1,2,5,6,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 5 | 6 | DI0 | DI1 | 7 | 8 | 1 | 2 | 5 | 6 | 1 |
| 1000 | 2 | 5 | 6 | 7 | DI0 | DI1 | DI2 | 8 | 1 | 2 | 5 | 6 | 1 |
| 1100 | 5 | 6 | 7 | 8 | DI0 | DI1 | DI2 | DI3 | 1 | 2 | 5 | 6 | 1 |
| 1110 | 6 | 7 | 8 | 3 | DI0 | DI1 | DI2 | DI3 | 1 | 2 | 5 | 6 | 0 |
| 1111 | 7 | 8 | 3 | 4 | DI0 | DI1 | DI2 | DI3 | 1 | 2 | 5 | 6 | 0 |

FIG. 4E

MODE #7 (VALID DATA POSITION = 1,2,3,5,6,7,8)

| SO | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 5 | DI0 | 6 | 7 | 8 | 1 | 2 | 3 | 5 | 1 |
| 1000 | 2 | 3 | 5 | 6 | DI0 | DI1 | 7 | 8 | 1 | 2 | 3 | 5 | 1 |
| 1100 | 3 | 5 | 6 | 7 | DI0 | DI1 | DI2 | 8 | 1 | 2 | 3 | 5 | 1 |
| 1110 | 5 | 6 | 7 | 8 | DI0 | DI1 | DI2 | DI3 | 1 | 2 | 3 | 5 | 1 |
| 1111 | 6 | 7 | 8 | 3 | DI0 | DI1 | DI2 | DI3 | 1 | 2 | 3 | 5 | 0 |

MODE #0

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 5 | 6 | 7 | 8 | D0 | D1 | D2 | D3 | 5 | 6 | 7 | 8 | 0 |
| 1000 | 6 | 7 | 8 | 4 | D0 | D1 | D2 | D3 | 5 | 6 | 7 | 8 | 0 |
| 1100 | 7 | 8 | 3 | 4 | D0 | D1 | D2 | D3 | 5 | 6 | 7 | 8 | 0 |
| 1110 | 8 | 2 | 3 | 4 | D0 | D1 | D2 | D3 | 5 | 6 | 7 | 8 | 0 |
| 1111 | 1 | 2 | 3 | 4 | D0 | D1 | D2 | D3 | 5 | 6 | 7 | 8 | 0 |

FIG. 12B

MODE #4 (VALID DATA POSITION = 5, 6, 7, 8)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 5 | 6 | 7 | 8 | D0 | D1 | D2 | D3 | 5 | 6 | 7 | 8 | 0 |
| 1000 | 6 | 7 | 8 | 9 | 0  | 0  | D2 | D3 | 5 | 6 | 7 | 8 | 0 |
| 1100 | 7 | 8 | 9 | a | 0  | 0  | 0  | D3 | 5 | 6 | 7 | 8 | 0 |
| 1110 | 8 | 9 | a | b | 0  | 0  | 0  | D3 | 5 | 6 | 7 | 8 | 0 |
| 1111 | 1 | 2 | 3 | 4 | D0 | D1 | D2 | D3 | 5 | 6 | 7 | 8 | 0 |

FIG. 12C

MODE #1 (VALID DATA POSITION = 1)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | a | b | 8 | 5 | 6 | 7 | D3 | 1 | 6 | 7 | 8 | 0 |
| 1000 | 5 | 7 | 7 | 8 | D0 | D1 | D2 | D3 | 1 | 6 | 7 | 8 | 0 |
| 1100 | 5 | 7 | 7 | 8 | D0 | D1 | D2 | D3 | 1 | 6 | 7 | 8 | 0 |
| 1110 | 5 | 7 | 7 | 8 | D0 | D1 | D2 | D3 | 1 | 6 | 7 | 8 | 0 |
| 1111 | 5 | 6 | 7 | 8 | D0 | D1 | D2 | D3 | 1 | 6 | 7 | 8 | 0 |

FIG. 12D

MODE #2 (VALID DATA POSITION = 1, 2)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 9 | a | 5 | 6 | D12 | D13 | 1 | 2 | 7 | 8 | 0 |
| 1000 | 2 | 9 | a | b | 5 | 6 | 7   | D13 | 1 | 2 | 7 | 8 | 0 |
| 1100 | 5 | 6 | 7 | 8 | D0 | D1 | D2 | D3 | 1 | 2 | 7 | 8 | 0 |
| 1110 | 5 | 6 | 7 | 8 | D0 | D1 | D2 | D3 | 1 | 2 | 7 | 8 | 0 |
| 1111 | 5 | 6 | 7 | 8 | D0 | D1 | D2 | D3 | 1 | 2 | 7 | 8 | 0 |

FIG. 12E

MODE #3 (VALID DATA POSITION = 1, 2, 3)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 9 | 5 | D11 | D12 | D13 | 1 | 2 | 3 | 8 | 0 |
| 1000 | 2 | 3 | 9 | a | 5 | 6   | D12 | D13 | 1 | 2 | 3 | 8 | 0 |
| 1100 | 3 | 9 | a | b | 5 | 6   | 7   | D13 | 1 | 2 | 3 | 8 | 0 |
| 1110 | 5 | 6 | 7 | 8 | D0 | D1 | D2 | D3 | 1 | 2 | 3 | 8 | 0 |
| 1111 | 5 | 6 | 7 | 8 | D0 | D1 | D2 | D3 | 1 | 2 | 3 | 8 | 0 |

MODE #7 (VALID DATA POSITION = 1, 2, 3, 4, 6, 7, 8)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | 6 | 7 | 8 | 1 | 2 | 3 | 4 | 1 |
| 1000 | — | 2 | 3 | 4 | DI0 | DI1 | 7 | 8 | 1 | 2 | 3 | 4 | 1 |
| 1100 | — | — | 3 | 4 | DI0 | DI1 | DI2 | 8 | 1 | 2 | 3 | 4 | 1 |
| 1110 | — | — | — | 4 | DI0 | DI1 | DI2 | DI3 | 1 | 2 | 3 | 4 | 1 |
| 1111 | — | — | — | — | DI0 | DI1 | DI2 | DI3 | 1 | 2 | 3 | 4 | 0 |

FIG. 13D

MODE #8 (VALID DATA POSITION = 1, 2, 3, 4, 5, 6, 7, 8)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | 5 | 6 | 7 | 8 | 1 | 2 | 3 | 4 | 1 |
| 1000 | — | 2 | 3 | 4 | 5 | 6 | 7 | 8 | 1 | 2 | 3 | 4 | 1 |
| 1100 | — | — | 3 | 4 | 5 | 6 | DI1 | 7 | 1 | 2 | 3 | 4 | 1 |
| 1110 | — | — | — | 4 | 5 | DI1 | DI0 | DI2 | 1 | 2 | 3 | 4 | 1 |
| 1111 | — | — | — | — | 5 | DI1 | DI2 | DI3 | 1 | 2 | 3 | 4 | 0 |

FIG. 13E

MODE #4 (VALID DATA POSITION = 1, 2, 3, 4)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | DI1 | DI2 | DI3 | 1 | 2 | 3 | 4 | 0 |
| 1000 | — | 2 | 3 | 4 | DI0 | DI1 | DI2 | DI3 | 1 | 2 | 3 | 4 | 0 |
| 1100 | — | — | 3 | 4 | DI0 | DI1 | DI2 | DI3 | 1 | 2 | 3 | 4 | 0 |
| 1110 | — | — | — | 4 | DI0 | DI1 | DI2 | DI3 | 1 | 2 | 3 | 4 | 0 |
| 1111 | — | — | — | — | DI0 | DI1 | DI2 | DI3 | 1 | 2 | 3 | 4 | 0 |

FIG. 13A

MODE #5 (VALID DATA POSITION = 1, 2, 3, 4, 8)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | DI1 | DI2 | 8 | 1 | 2 | 3 | 4 | 1 |
| 1000 | — | 2 | 3 | 4 | 8 | DI0 | DI1 | DI2 | 1 | 2 | 3 | 4 | 0 |
| 1100 | — | — | 3 | 4 | DI0 | DI1 | DI2 | DI3 | 1 | 2 | 3 | 4 | 0 |
| 1110 | — | — | — | 4 | DI0 | DI1 | DI2 | DI3 | 1 | 2 | 3 | 4 | 0 |
| 1111 | — | — | — | — | DI0 | DI1 | DI2 | DI3 | 1 | 2 | 3 | 4 | 0 |

FIG. 13B

MODE #6 (VALID DATA POSITION = 1, 2, 3, 4, 7, 8)

| S0 | 1 | 2 | 3 | 4 | 5 | 6 | 7 | 8 | D0 | D1 | D2 | D3 | FF |
|---|---|---|---|---|---|---|---|---|---|---|---|---|---|
| 0000 | 1 | 2 | 3 | 4 | DI0 | DI1 | 7 | 8 | 1 | 2 | 3 | 4 | 1 |
| 1000 | — | 2 | 3 | 4 | 7 | 8 | DI0 | DI1 | 1 | 2 | 3 | 4 | 1 |
| 1100 | — | — | 3 | 4 | 8 | DI0 | DI1 | DI2 | 1 | 2 | 3 | 4 | 0 |
| 1110 | — | — | — | 4 | DI0 | DI1 | DI2 | DI3 | 1 | 2 | 3 | 4 | 0 |
| 1111 | — | — | — | — | DI0 | DI1 | DI2 | DI3 | 1 | 2 | 3 | 4 | 0 |

FIG. 13C

MODE #0, #4 (VALID DATA POSITION = 5, 6, 7, 8)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 6 | 8 | DI0 | DI1 | DI2 | DI3 | 5 | 6 | 7 | 8 | 0000 | 5 |
| 1000 | 5 | 6 | 7 | 4 | DI0 | DI1 | DI2 | DI3 | 5 | 6 | 7 | 8 | 0000 | 5 |
| 1100 | 6 | 7 | 8 | 4 | DI0 | DI1 | DI2 | DI3 | 5 | 6 | 7 | 8 | 0000 | 5 |
| 1110 | 7 | 8 | 3 | 4 | DI0 | DI1 | DI2 | DI3 | 5 | 6 | 7 | 8 | 0000 | 5 |
| 1111 | 8 | 2 | 3 | 4 | DI0 | DI1 | DI2 | DI3 | 5 | 6 | 7 | 8 | 0000 | 5 |

FIG. 16A

MODE #1 (VALID DATA POSITION = 1)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 5 | 6 | 7 | DI0 | DI1 | DI2 | DI3 | 1 | 5 | 6 | 7 | 0000 | 5 |
| 1000 | 5 | 6 | 7 | 8 | DI0 | DI1 | DI2 | DI3 | 1 | 5 | 6 | 7 | 0000 | 5 |
| 1100 | 6 | 7 | 8 | 4 | DI0 | DI1 | DI2 | DI3 | 1 | 5 | 6 | 7 | 0000 | 5 |
| 1110 | 7 | 8 | 3 | 4 | DI0 | DI1 | DI2 | DI3 | 1 | 5 | 6 | 7 | 0000 | 5 |
| 1111 | 8 | 2 | 3 | 4 | DI0 | DI1 | DI2 | DI3 | 1 | 5 | 6 | 7 | 0000 | 5 |

FIG. 16B

MODE #2 (VALID DATA POSITION = 1, 2)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 5 | 6 | DI0 | DI1 | DI2 | DI3 | 1 | 2 | 5 | 6 | 0000 | 5 |
| 1000 | 2 | 5 | 6 | 7 | DI0 | DI1 | DI2 | DI3 | 1 | 2 | 5 | 6 | 0000 | 5 |
| 1100 | 5 | 6 | 7 | 8 | DI0 | DI1 | DI2 | DI3 | 1 | 2 | 5 | 6 | 0000 | 5 |
| 1110 | 6 | 7 | 8 | 3 | DI0 | DI1 | DI2 | DI3 | 1 | 2 | 5 | 6 | 0000 | 5 |
| 1111 | 7 | 8 | 3 | 4 | DI0 | DI1 | DI2 | DI3 | 1 | 2 | 5 | 6 | 0000 | 5 |

FIG. 16C

MODE #3 (VALID DATA POSITION = 1, 2, 3)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 5 | DI0 | DI1 | DI2 | DI3 | 1 | 2 | 3 | 5 | 0000 | 5 |
| 1000 | 2 | 3 | 5 | 6 | DI0 | DI1 | DI2 | DI3 | 1 | 2 | 3 | 5 | 0000 | 5 |
| 1100 | 3 | 5 | 6 | 7 | DI0 | DI1 | DI2 | DI3 | 1 | 2 | 3 | 5 | 0000 | 5 |
| 1110 | 5 | 6 | 7 | 8 | DI0 | DI1 | DI2 | DI3 | 1 | 2 | 3 | 5 | 0000 | 5 |
| 1111 | 6 | 7 | 8 | 4 | DI0 | DI1 | DI2 | DI3 | 1 | 2 | 3 | 5 | 0000 | 5 |

FIG. 16D

MODE #4 (VALID DATA POSITION = 1, 2, 3, 4)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | DI1 | DI2 | DI3 | 1 | 2 | 3 | 4 | 0000 | 5 |
| 1000 | 2 | 3 | 4 | 5 | DI0 | DI1 | DI2 | DI3 | 1 | 2 | 3 | 4 | 0000 | 5 |
| 1100 | 3 | 4 | 5 | 6 | DI0 | DI1 | DI2 | DI3 | 1 | 2 | 3 | 4 | 0000 | 5 |
| 1110 | 4 | 5 | 6 | 7 | DI0 | DI1 | DI2 | DI3 | 1 | 2 | 3 | 4 | 0000 | 5 |
| 1111 | 5 | 6 | 7 | 8 | DI0 | DI1 | DI2 | DI3 | 1 | 2 | 3 | 4 | 0000 | 5 |

FIG. 16E

MODE #5 (VALID DATA POSITION = 1, 2, 3, 4, 5)

| S0 | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | DI1 | DI2 | DI3 | 1 | 2 | 3 | 4 | 1000 | 5 |
| 1000 | 2 | 3 | 4 | 5 | DI0 | DI1 | DI2 | DI3 | 1 | 2 | 3 | 4 | 0000 | 6 |
| 1100 | 3 | 4 | 5 | 6 | DI0 | DI1 | DI2 | DI3 | 1 | 2 | 3 | 4 | 0000 | 6 |
| 1110 | 4 | 5 | 6 | 7 | DI0 | DI1 | DI2 | DI3 | 1 | 2 | 3 | 4 | 0000 | 6 |
| 1111 | 5 | 6 | 7 | 8 | DI0 | DI1 | DI2 | DI3 | 1 | 2 | 3 | 4 | 0000 | 6 |

FIG. 16F

MODE #5 (VALID DATA POSITION = 1, 2, 3, 4, 6)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | 6 | DI2 | DI3 | 1 | 2 | 3 | 4 | 0100 | 6 |
| 1000 | 2 | 3 | 4 | 6 | DI0 | DI1 | DI2 | DI3 | 1 | 2 | 3 | 4 | 0000 | 7 |
| 1100 | 3 | 4 | 6 | 7 | DI0 | DI1 | DI2 | DI3 | 1 | 2 | 3 | 4 | 0000 | 7 |
| 1110 | 4 | 6 | 7 | 8 | DI0 | DI1 | DI2 | DI3 | 1 | 2 | 3 | 4 | 0000 | 7 |
| 1111 | 6 | 7 | 8 | 5 | DI0 | DI1 | DI2 | DI3 | 1 | 2 | 3 | 4 | 0000 | 7 |

FIG. 17A

MODE #5 (VALID DATA POSITION = 1, 2, 3, 4, 7)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | DI1 | 7 | DI3 | 1 | 2 | 3 | 4 | 0010 | 7 |
| 1000 | 2 | 3 | 4 | 7 | DI0 | DI1 | DI2 | DI3 | 1 | 2 | 3 | 4 | 0000 | 8 |
| 1100 | 3 | 4 | 7 | 8 | DI0 | DI1 | DI2 | DI3 | 1 | 2 | 3 | 4 | 0000 | 8 |
| 1110 | 4 | 7 | 8 | 5 | DI0 | DI1 | DI2 | DI3 | 1 | 2 | 3 | 4 | 0000 | 8 |
| 1111 | 7 | 8 | 5 | 6 | DI0 | DI1 | DI2 | DI3 | 1 | 2 | 3 | 4 | 0000 | 8 |

FIG. 17B

MODE #5 (VALID DATA POSITION = 1, 2, 3, 4, 8)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | DI1 | DI2 | 8 | 1 | 2 | 3 | 4 | 0001 | 8 |
| 1000 | 2 | 3 | 4 | 8 | DI0 | DI1 | DI2 | DI3 | 1 | 2 | 3 | 4 | 0000 | 5 |
| 1100 | 3 | 4 | 8 | 5 | DI0 | DI1 | DI2 | DI3 | 1 | 2 | 3 | 4 | 0000 | 5 |
| 1110 | 4 | 8 | 5 | 6 | DI0 | DI1 | DI2 | DI3 | 1 | 2 | 3 | 4 | 0000 | 5 |
| 1111 | 8 | 5 | 6 | 7 | DI0 | DI1 | DI2 | DI3 | 1 | 2 | 3 | 4 | 0000 | 5 |

FIG. 17C

MODE #6 (VALID DATA POSITION = 1, 2, 3, 4, 5, 6)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | 6 | DI2 | DI3 | 1 | 2 | 3 | 4 | 1100 | 5 |
| 1000 | 2 | 3 | 4 | 5 | 6 | DI0 | DI2 | DI3 | 1 | 2 | 3 | 4 | 0100 | 6 |
| 1100 | 3 | 4 | 5 | 6 | DI0 | DI1 | DI2 | DI3 | 1 | 2 | 3 | 4 | 0000 | 7 |
| 1110 | 4 | 5 | 6 | 7 | DI0 | DI1 | DI2 | DI3 | 1 | 2 | 3 | 4 | 0000 | 7 |
| 1111 | 5 | 6 | 7 | 8 | DI0 | DI1 | DI2 | DI3 | 1 | 2 | 3 | 4 | 0000 | 7 |

FIG. 17D

MODE #6 (VALID DATA POSITION = 1, 2, 3, 4, 6, 7)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | 6 | 7 | DI3 | 1 | 2 | 3 | 4 | 0110 | 6 |
| 1000 | 2 | 3 | 4 | 6 | DI0 | DI1 | 7 | DI3 | 1 | 2 | 3 | 4 | 0010 | 7 |
| 1100 | 3 | 4 | 6 | 7 | DI0 | DI1 | DI2 | DI3 | 1 | 2 | 3 | 4 | 0000 | 8 |
| 1110 | 4 | 6 | 7 | 8 | DI0 | DI1 | DI2 | DI3 | 1 | 2 | 3 | 4 | 0000 | 8 |
| 1111 | 6 | 7 | 8 | 5 | DI0 | DI1 | DI2 | DI3 | 1 | 2 | 3 | 4 | 0000 | 8 |

FIG. 17E

MODE #6 (VALID DATA POSITION = 1, 2, 3, 4, 7, 8)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | DI1 | 7 | 8 | 1 | 2 | 3 | 4 | 0011 | 7 |
| 1000 | 2 | 3 | 4 | 7 | DI0 | DI1 | DI2 | 8 | 1 | 2 | 3 | 4 | 0001 | 8 |
| 1100 | 3 | 4 | 7 | 8 | DI0 | DI1 | DI2 | DI3 | 1 | 2 | 3 | 4 | 0000 | 5 |
| 1110 | 4 | 7 | 8 | 5 | DI0 | DI1 | DI2 | DI3 | 1 | 2 | 3 | 4 | 0000 | 5 |
| 1111 | 7 | 8 | 5 | 6 | DI0 | DI1 | DI2 | DI3 | 1 | 2 | 3 | 4 | 0000 | 5 |

FIG. 17F

FIG. 18A MODE #6 (VALID DATA POSITION = 1, 2, 3, 4, 8, 5)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | DI1 | DI2 | 8 | 1 | 2 | 3 | 4 | 1001 | 8 |
| 1000 | 2 | 3 | 4 | 8 | DI0 | DI1 | DI2 | DI3 | 1 | 2 | 3 | 4 | 1000 | 5 |
| 1100 | 3 | 4 | 8 | 5 | DI0 | DI1 | DI2 | DI3 | 1 | 2 | 3 | 4 | 0000 | 6 |
| 1110 | 4 | 8 | 5 | 6 | DI0 | DI1 | DI2 | DI3 | 1 | 2 | 3 | 4 | 0000 | 6 |
| 1111 | 8 | 5 | 6 | 7 | DI0 | DI1 | DI2 | DI3 | 1 | 2 | 3 | 4 | 0000 | 6 |

FIG. 18B MODE #7 (VALID DATA POSITION = 1, 2, 3, 4, 5, 6, 7)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | 6 | 7 | DI3 | 1 | 2 | 3 | 4 | 1110 | 5 |
| 1000 | 2 | 3 | 4 | 5 | 6 | 7 | DI2 | DI3 | 1 | 2 | 3 | 4 | 0110 | 6 |
| 1100 | 3 | 4 | 5 | 6 | 7 | DI1 | DI2 | DI3 | 1 | 2 | 3 | 4 | 0010 | 7 |
| 1110 | 4 | 5 | 6 | 7 | DI0 | DI1 | DI2 | DI3 | 1 | 2 | 3 | 4 | 0000 | 8 |
| 1111 | 5 | 6 | 7 | 8 | DI0 | DI1 | DI2 | DI3 | 1 | 2 | 3 | 4 | 0000 | 8 |

FIG. 18C MODE #7 (VALID DATA POSITION = 1, 2, 3, 4, 6, 7, 8)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | DI0 | 6 | 7 | 8 | 1 | 2 | 3 | 4 | 0111 | 6 |
| 1000 | 2 | 3 | 4 | 6 | DI0 | DI1 | 7 | 8 | 1 | 2 | 3 | 4 | 0011 | 7 |
| 1100 | 3 | 4 | 6 | 7 | DI0 | DI1 | DI2 | 8 | 1 | 2 | 3 | 4 | 0001 | 8 |
| 1110 | 4 | 6 | 7 | 8 | DI0 | DI1 | DI2 | DI3 | 1 | 2 | 3 | 4 | 0000 | 5 |
| 1111 | 6 | 7 | 8 | 6 | DI0 | DI1 | DI2 | DI3 | 1 | 2 | 3 | 4 | 0000 | 5 |

FIG. 18D MODE #7 (VALID DATA POSITION = 1, 2, 3, 4, 7, 6, 5)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | DI1 | 7 | 8 | 1 | 2 | 3 | 4 | 1011 | 7 |
| 1000 | 2 | 3 | 4 | 7 | DI0 | DI1 | DI2 | DI3 | 1 | 2 | 3 | 4 | 1001 | 8 |
| 1100 | 3 | 4 | 7 | 8 | DI0 | DI1 | DI2 | DI3 | 1 | 2 | 3 | 4 | 1000 | 5 |
| 1110 | 4 | 7 | 6 | 5 | DI0 | DI1 | DI2 | DI3 | 1 | 2 | 3 | 4 | 0000 | 6 |
| 1111 | 7 | 6 | 5 | 6 | DI0 | DI1 | DI2 | DI3 | 1 | 2 | 3 | 4 | 0000 | 6 |

FIG. 18E MODE #7 (VALID DATA POSITION = 1, 2, 3, 4, 8, 5, 6)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | 6 | DI2 | 8 | 1 | 2 | 3 | 4 | 1101 | 8 |
| 1000 | 2 | 3 | 4 | 8 | 5 | 6 | DI2 | DI3 | 1 | 2 | 3 | 4 | 1100 | 5 |
| 1100 | 3 | 4 | 8 | 5 | DI0 | DI1 | DI2 | DI3 | 1 | 2 | 3 | 4 | 0100 | 6 |
| 1110 | 4 | 8 | 5 | 6 | DI0 | DI1 | DI2 | DI3 | 1 | 2 | 3 | 4 | 0000 | 7 |
| 1111 | 8 | 5 | 6 | 7 | DI0 | DI1 | DI2 | DI3 | 1 | 2 | 3 | 4 | 0000 | 7 |

FIG. 18F MODE #8 (VALID DATA POSITION = 1, 2, 3, 4, 5, 6, 7, 8 WHEN THE POINTER IS 5)

| SO | 1 | 2 | 3 | 4 | 5 | 6 | 7 | 8 | D0 | D1 | D2 | D3 | FF | POINTER |
|---|---|---|---|---|---|---|---|---|---|---|---|---|---|---|
| 0000 | 1 | 2 | 3 | 4 | 5 | 6 | 7 | 8 | 1 | 2 | 3 | 4 | 1111 | 5 |
| 1000 | 2 | 3 | 4 | 5 | 6 | 6 | 7 | 8 | 1 | 2 | 3 | 4 | 0111 | 6 |
| 1100 | 3 | 4 | 5 | 6 | DI0 | DI1 | 7 | 8 | 1 | 2 | 3 | 4 | 0011 | 7 |
| 1110 | 4 | 5 | 6 | 7 | DI0 | DI1 | DI2 | 8 | 1 | 2 | 3 | 4 | 0001 | 8 |
| 1111 | 5 | 6 | 7 | 8 | DI0 | DI1 | DI2 | DI3 | 1 | 2 | 3 | 4 | 0000 | 5 |

MODE #8 (VALID DATA POSITION = 1, 2, 3, 4, 5, 6, 7, 8 WHEN THE POINTER IS 6)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 2 | 3 | 4 | 5 | 6 | 7 | 8 | 1 2 3 4 | 1111 | 6 |
| 1000 | | 2 | 3 | 4 | 5 | 6 | 7 | 8 | 1 2 3 4 | 1011 | 7 |
| 1100 | | | 3 | 4 | 5 | 6 | 7 | 8 | 1 2 3 4 | 1001 | 8 |
| 1110 | | | | 4 | 5 | 6 | 7 | 8 | 1 2 3 4 | 1000 | 5 |
| 1111 | | | | | D0 | D1 | D2 | D3 | 1 2 3 4 | 0000 | 6 |

FIG. 19A

MODE #8 (VALID DATA POSITION = 1, 2, 3, 4, 5, 6, 7, 8 WHEN THE POINTER IS 7)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 2 | 3 | 4 | 5 | 6 | 7 | 8 | 1 2 3 4 | 1111 | 7 |
| 1000 | | 2 | 3 | 4 | 5 | 6 | 7 | 8 | 1 2 3 4 | 1101 | 8 |
| 1100 | | | 3 | 4 | 5 | 6 | 7 | 8 | 1 2 3 4 | 1100 | 5 |
| 1110 | | | | 4 | 5 | 6 | D2 | D3 | 1 2 3 4 | 0100 | 6 |
| 1111 | | | | | D0 | D1 | D2 | D3 | 1 2 3 4 | 0000 | 7 |

FIG. 19B

MODE #8 (VALID DATA POSITION = 1, 2, 3, 4, 5, 6, 7, 8 WHEN THE POINTER IS 8)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 2 | 3 | 4 | 5 | 6 | 7 | 8 | 1 2 3 4 | 1111 | 8 |
| 1000 | | 2 | 3 | 4 | 5 | 6 | 7 | D3 | 1 2 3 4 | 1110 | 5 |
| 1100 | | | 3 | 4 | 5 | 6 | D2 | D3 | 1 2 3 4 | 0110 | 6 |
| 1110 | | | | 4 | 5 | D1 | D2 | D3 | 1 2 3 4 | 0010 | 7 |
| 1111 | | | | | D0 | D1 | D2 | D3 | 1 2 3 4 | 0000 | 8 |

FIG. 19C

MODE #5 (VALID DATA POSITION = 1, 5, 6, 7, 8)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 5 | 6 | 7 | 8 | | | | 1 5 6 7 | 0001 | 8 |
| 1000 | | 5 | 6 | 7 | 8 | D0 | D1 | D2 D3 | 1 5 6 7 | 0000 | 5 |
| 1100 | | | 6 | 7 | 8 | D0 | D1 | D2 D3 | 1 5 6 7 | 0000 | 5 |
| 1110 | | | | 7 | 8 | D0 | D1 | D2 D3 | 1 5 6 7 | 0000 | 5 |
| 1111 | | | | | 8 | D0 | D1 | D2 D3 | 1 5 6 7 | 0000 | 5 |

FIG. 19D

MODE #6 (VALID DATA POSITION = 1, 2, 5, 6, 7, 8)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 2 | 5 | 6 | 7 | 8 | | | 1 2 5 6 | 0011 | 7 |
| 1000 | | 2 | 5 | 6 | 7 | 8 | D1 | D2 D3 | 1 2 5 6 | 0001 | 8 |
| 1100 | | | 5 | 6 | 7 | 8 | D1 | D2 D3 | 1 2 5 6 | 0000 | 5 |
| 1110 | | | | 6 | 7 | 8 | D1 | D2 D3 | 1 2 5 6 | 0000 | 5 |
| 1111 | | | | | 7 | 8 | D1 | D2 D3 | 1 2 5 6 | 0000 | 5 |

FIG. 19E

MODE #7 (VALID DATA POSITION = 1, 2, 3, 5, 6, 7, 8)

| SO | 1 | 2 | 3 | 4 | 5 | 6 | 7 | 8 | D0 D1 D2 D3 | FF | POINTER |
|---|---|---|---|---|---|---|---|---|---|---|---|
| 0000 | 1 | 2 | 3 | 5 | 6 | 7 | 8 | | 1 2 3 5 | 0111 | 6 |
| 1000 | | 2 | 3 | 5 | 6 | 7 | 8 | D2 D3 | 1 2 3 5 | 0011 | 7 |
| 1100 | | | 3 | 5 | 6 | 7 | 8 | D2 D3 | 1 2 3 5 | 0001 | 8 |
| 1110 | | | | 5 | 6 | 7 | D2 | D3 | 1 2 3 5 | 0000 | 5 |
| 1111 | | | | | 6 | 7 | D2 | D3 | 1 2 3 5 | 0000 | 5 |

FIG. 19F

FIFO CIRCUIT

FIELD OF THE INVENTION

The present invention generally relates to FIFO circuits, and particularly relates to a FIFO circuit that serves as a data buffer to absorb data-speed changes between a data-supply side and a data-reception side.

BACKGROUND OF THE INVENTION

Conventionally, FIFO (first-in first-out) circuits are used as a buffer placed between a module for supplying data and a module for receiving data, and absorb data-speed changes between a data-supply side and a data-reception side, thereby achieving efficient data transmission.

A super scalar scheme is a technology that enhances performance of data processing units using FIFO circuits. This scheme achieves parallel processing of instructions. A FIFO circuit is used as a buffer that efficiently feeds instructions to a pipeline. In this configuration, the FIFO circuit is provided with extended ports in order to allow simultaneous access to a plurality of instructions to the extent commensurate with the degree of parallelism. A port is defined as a unit that permits simultaneous reading/writing of one memory cell.

In a data processing unit capable of simultaneous processing of four instructions, a FIFO circuit having four ports for data writing and four ports for data reading may be provided in an instruction fetch unit at a start of a pipeline. In this configuration, the FIFO circuit accumulates a stream of instructions that stalled at an instruction generation unit as they wait for available resources of the data processing unit, and serves to compensate for a gap created when an instruction cache fails to hit an instruction.

Japanese Patent Laid-open Application No.5-314758 discloses a FIFO circuit. This FIFO circuit includes a shift register that accumulates data received from a prior stage in synchronism with an input clock S1, a counter circuit that counts up in response to the input clock S1 and counts down in response to an output clock, and an output selecting circuit that selects a stage of the shift register that corresponds to the count of the counter circuit and outputs an output of the selected stage.

This FIFO circuit has one input port and one output port. If a plurality of input ports and output ports are provided, a circuit configuration as shown in FIG. 1 may be conceived.

FIG. 1 is a circuit diagram of a FIFO circuit used in the super scalar scheme. In the figure, DI0 through DI3 denote input ports. Instruction data coming to the input port are supplied to shift registers 10 through 13, respectively. Here, the shift registers 10 through 13 have a two-stage configuration.

The first stage of the shift register 10 is connected to output ports D0 through D3 via respective tri-state buffers provided in a selector circuit 14. The second stage is connected to the output port D0 via one tri-state buffer. The first stage of the shift register 11 is connected to the output ports D0 through D3 via respective tri-state buffers provided in the selector circuit 14. The second stage is connected to the output ports D0 and D1 via respective tri-state buffers.

The first stage of the shift register 12 is connected to the output ports D0 through D3 via respective tri-state buffers provided in the selector circuit 14. The second stage is connected to the output ports D0, D1, and D2 via respective tri-state buffers. The first and second stages of the shift register 13 are each connected to the output ports D0 through D3 via respective tri-state buffers provided in the selector circuit 14.

A control circuit 15 controls valid data positions of the shift registers 10 through 13. Further., the control circuit 15 generates control signals EF0 through EF3 and FF0 through FF3 in accordance with input-request-number signals (number of data items) SI0 through SI3 and output-request number signals (number of data items) SO0 through SO3 as well as in accordance with the valid data positions. The control signals are used for controlling the tri-state buffers in the selector circuit 14, so that a number of data items, corresponding to the output-request number, are output from the output ports D0 through D3. Here, data is output from the output port D0 when the output-request number is 1 and data is output from the output ports D0 and D1 when the output-request number is 2. By the same token, the output ports D0 through D2 output data when the output-request number is 3.

In the FIFO circuit of the related art, the output port D0 is connected to eight tri-state buffers of the selector circuit 14, and the output port D1 is connected to seven tri-state buffers of the selector circuit 14. Further, the output port D2 is connected to six tri-state buffers of the selector circuit 14, and the output port D3 is connected to five tri-state buffers of the selector circuit 14.

The greater the number of tri-state buffers connected to an output port, the greater the load, thus preventing high-speed operation. In an integrated circuit, signal transmission is affected by using high and low levels of signal-line potential as signal information. A voltage difference V is achieved by accumulating (or discharging) charge Q on a signal line having a capacitance C. In this case, these parameters are related as:

$$Q=CV \quad (1)$$

Charge Q is represented by an average electrical current Iave and time t as follows.

$$Q=I_{ave}t \quad (2)$$

From the equations (1) and (2), the following relation is obtained.

$$dt=CdV/I_{ave} \quad (3)$$

The equation (3) indicates that a time delay dt is related to a product of a parasitic capacitance C and a turn-on resistance of a transistor that is equal to a voltage difference dV divided by the average current Iave. Improvement in operational speed of integrated circuits has been attained by lowering the parasitic capacitance C via miniaturization of circuits, by lowering the voltage difference dV via use of a lower power voltage, and by increasing the average current Iave via use of low-resistance wiring material such as copper. The parasitic capacitance C is greatly affected by a technology used for manufacturing the integrated circuit and a structure of equal-voltage nodes. The larger the wires or the larger the number of connected transistors, the greater the parasitic capacitance C that needs to be charged or discharged.

As previously described, the FIFO circuit of the related art has a large number of tri-state buffers and thus a large number of transistors connected to each of the output ports D0 through D3. As a result, it has a large parasitic capacitance C, which hinders high-speed operation.

Accordingly, the present invention is aimed at providing a FIFO circuit capable of high-speed operation by reducing the number of buffers connected to output ports and thereby lowering parasitic capacitance.

SUMMARY OF THE INVENTION

The invention is directed to a FIFO circuit having a plurality of input ports permitting parallel access thereto and a plurality of output ports.

The FIFO circuit has an input register which stores data supplied from the plurality of input ports. A shifter rearranges the data supplied from input register and a shift register stores and shifts the data supplied from the shifter. A selector circuit selects either the data supplied from the input register or the data supplied from the shift register such that valid data fill places of the output ports from a least significant side of the output ports. A control circuit manages the valid data of the input register and the shift register and controls the input register, shift register and selector circuit.

In this manner, the shifter rearranges the data supplied from the input register so as to shift the data inside the shift register. As a result, the present invention can reduce the number of buffers connecting the input register and the shift register to the plurality of output ports in the selector circuit, thereby lowering the parasitic capacitance of each output port so as to achieve high-speed operation.

Another embodiment is directed to a FIFO circuit having a plurality of input ports permitting parallel access thereto and a plurality of output ports. This FIFO circuit includes an input register which stores data supplied from the plurality of input ports. An intermediate register and a multiplexer that selects either the data supplied from the input register or data supplied from the intermediate register and supplies the selected data to the intermediate register. The intermediate register stores the data supplied from the multiplexer and feeds back the stored data to the multiplexer. A selector circuit selects either the data supplied from the input register or the data supplied from the shift register such that valid data fill places of the output ports from a least significant side of the output ports. A control circuit manages the valid data of the input register and the intermediate register, and controls the input register, multiplexer, intermediate register, and the selector circuit.

In this manner, the multiplexer rearranges data supplied from the input register and the intermediate register. Therefore, the present invention can reduce the number of buffers connecting the input register and the shift register to the plurality of output ports in the selector circuit. Thus lowering the parasitic capacitance of each output port so as to achieve high-speed operation.

Another embodiment is directed to a FIFO circuit, wherein the control circuit receives a requested number of input data items and a requested number of output data items from the exterior of the FIFO circuit. In this configuration, the control circuit refers to the requested numbers of data input items and data output items as well as the valid data positions of the input register and the intermediate register. Based on this information, the control circuit ensures that valid data fills the places of the output ports from the least significant side of the output ports.

The control circuit can receive an indication of valid data input and a requested number of output data items from the exterior of the FIFO circuit. In this configuration, the control circuit refers to the indication of valid data input, the requested number of data output items, and the valid data positions of the input register and the intermediate register and based on this information, can control that the valid data fill the places of the output ports from the least significant side of the output ports.

Another embodiment is directed to a FIFO circuit having a plurality of input ports permitting parallel access thereto and a plurality of output ports. This FIFO circuit includes an intermediate register and an input register which stores data supplied from the plurality of input ports. A multiplexer selects one of the data supplied from the plurality of input ports, the data supplied from said input register, data supplied from said intermediate register, and supplies the selected data to said intermediate register such that valid data fill places from a least significant side. The intermediate register stores the data supplied from the multiplexer and feeds back the stored data to the multiplexer. A selector circuit selects either the data supplied from the input register or the data supplied from the intermediate register such that the valid data fill places of the output ports from a least significant side of the output ports. A control circuit receives a requested number of data output items from the exterior of the FIFO circuit, manages the valid data of the input register and the intermediate register, and controls the input register, the multiplexer, the intermediate register, and the selector circuit.

In this manner, the multiplexer rearranges data supplied from the plurality of input ports as well as the input register and the intermediate register. Therefore, the present invention can reduce the number of buffers connecting the input register and the shift register to the plurality of output ports in the selector circuit, thereby lowering a parasitic capacitance of each output port.

The control circuit can include a pointer that indicates a register position where data is to be output first. In this configuration, the pointer indicates a data position in the input register where the data of this data position is to be output first according to a prescribed order of data output. Even when the previous input data remains in the input register because the intermediate register is full and when the next data is stored at a data position that is designated for earlier output before the data position indicated by the pointer, no mistake will be made to output the next data ahead of the pointer indicated data. This allows the next data to be entered before the input register becomes fully empty. This configuration can make efficient use of the input register, thereby making is possible to reduce the number of registers in the input register and allowing the circuit to be smaller in terms of area size.

BRIEF DESCRIPTION OF THE DRAWINGS

FIGS. 3A–3F shows control-logic tables used by the control circuit 26.

FIGS. 4A–4F shows control-logic tables used by the control circuit 26.

FIGS. 12A–12E show control-logic tables used by the control circuit 77.

FIGS. 13A–13E show control-logic tables used by the control circuit 77.

FIGS. 16A–16F show control-logic tables used by the control circuit 87.

FIGS. 17A–17F show control-logic tables used by the control circuit 87.

FIGS. 18A–18F show control-logic tables used by the control circuit 87.

FIGS. 19A–19F show control-logic tables used by the control circuit 87.

DETAILED DESCRIPTION

Figure 1:
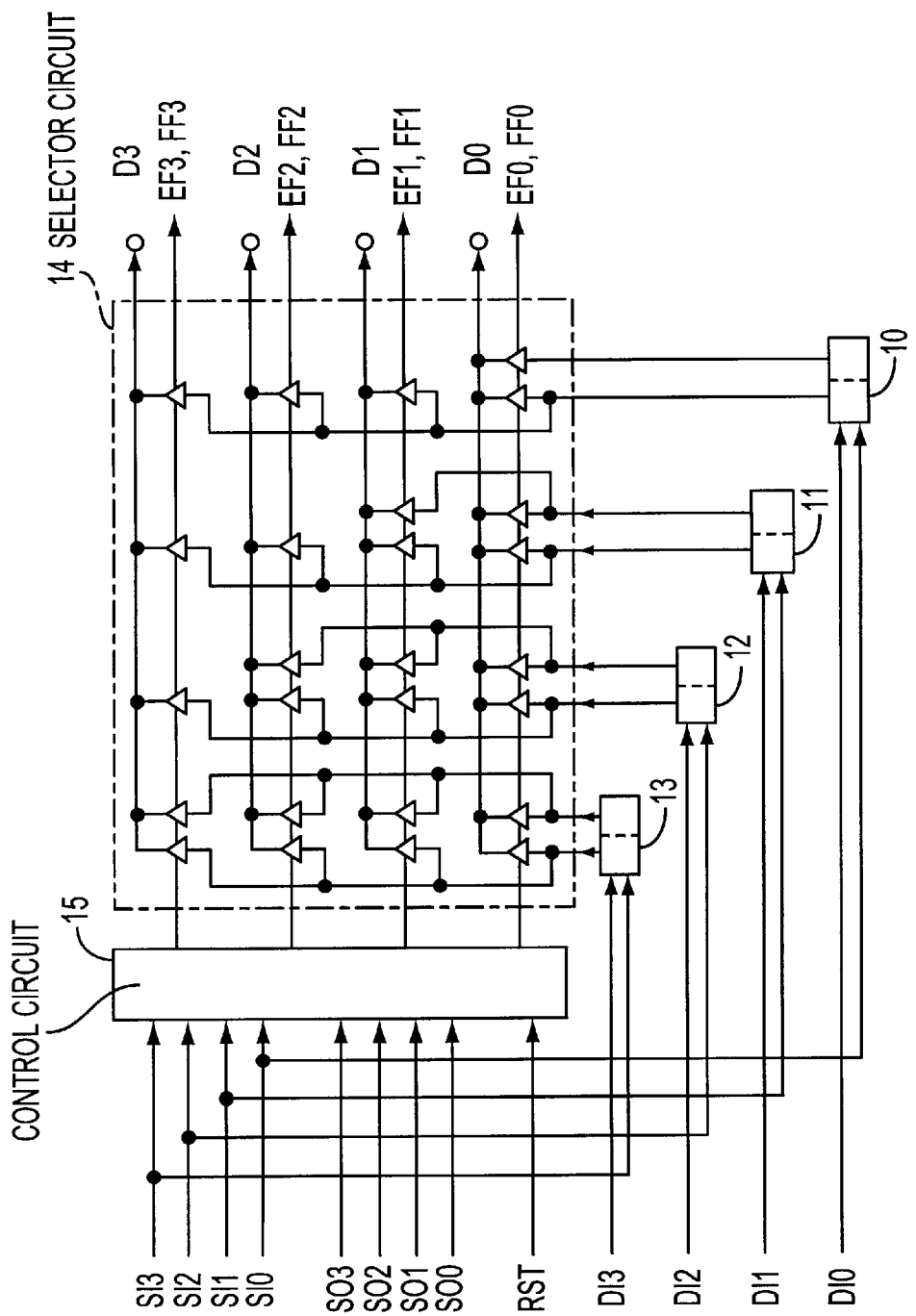
FIG. 1 is a circuit diagram showing an example of a related-art FIFO circuit used in the super scalar scheme.
Figure 2:
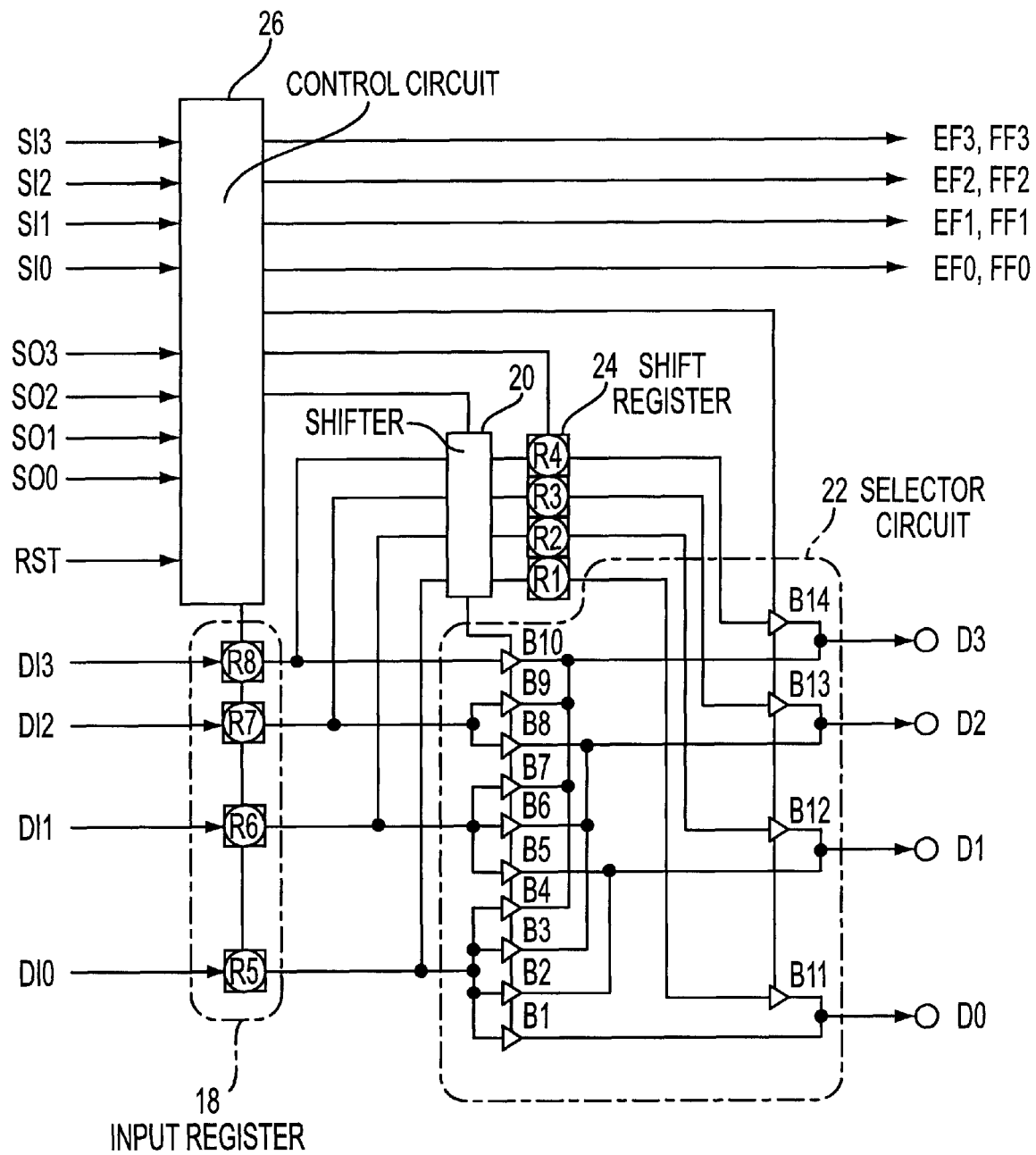
FIG. 2 is a block diagram of a first exemplary embodiment of a FIFO circuit used in the super scalar scheme according to the present invention.

FIG. 2 is a block diagram of a first embodiment of a FIFO circuit used in the super scalar scheme according to the present invention. In the figure, instruction data coming to the input ports DI0 through DI3 are supplied to registers R5 through R8, respectively. The registers R5 through R8 together form an input register 18, and each have a one-stage configuration.

The register R5 is connected to a shifter 20, and is connected to the output ports D0 through D3 via respective tri-state buffers B1 through B4 provided in a selector circuit 22. The register R6 is connected to the shifter 20, and is connected to the output ports D1 through D3 via respective tri-state buffers B5 through B7 provided in the selector circuit 22.

The register R7 is connected to the shifter 20, and is connected to the output ports D2 and D3 via respective tri-state buffers B8 and B9 provided in the selector circuit 22. The register RB is connected to the shifter 20, and is connected to the output port D3 via a tri-state buffer B10 provided in the selector circuit 22.

The shifter 20 receives instruction data from the registers R5 through R8, and supplies the instruction data to registers R1 through R4 after shifting the data or without any shifting of data.

The registers R1 through R4 together form a shift register 24. Each of the registers R1 through R4 are connected to the output ports D0 through D3 respectively, via respective tri-state buffers B1 through B14 provided in the selector circuit 22.

A control circuit 26 has an internal status (valid data positions) thereof initialized by a reset signal RST provided from an external source, and controls valid data positions of the registers R1 through R8. Further, the control circuit 26 attends to various control functions such as control of writing of data in the registers R5 through R8, control the shift operation of shifter 20, control the shift operation of shift register 24, and control the outputting operation of tri-state buffers B1 through B14 of selector circuit 22 based on input-request-number signals (number of data items) SI0 through SI3 and output-request-number signals (number of data items) SO0 through SO3 as well as based on the valid data positions. Through these controls, a number of data items, corresponding to the output-request number are output from the output ports D0 through D3. Further, the control circuit 26 generates empty flags EFO through EF3 and full flags FF0 through FF3.

Here, data is output from the output port D0 when the output-request number is 1, and data is output from the output ports D0 and D1 when the output-request number is 2. By the same token, the output ports D0 through D2 output data when the output-request number is 3, and the output ports D0 through D3 output data when the output-request number is 4.

Input instruction data is stored in the input register 18. The instruction data of the input register 18 is stored in the shift register 24 such that the shifter 20 arranges the instruction data of the input register 18 after the valid instruction data of the shift register 24 in order to maintain correct data-output order between the current instruction data and the previous instruction data. When the shift register 24 becomes full, part of the instruction data having late data-output order is left in the shifter 20. The instruction data is output to an exterior via the shift register 24 and the selector circuit 22 in the data-output order.

When the number of instruction data items stored in the shift register 24 is smaller than the number of the output ports, the instruction data stored in the input register 18 needs to be directed to the output ports by bypassing the shift register 24. The selector circuit 22 selects instruction data from the input register 18 as many as the number of data items lacking in the shift register 24, and outputs the selected instruction data while maintaining data continuity with the instruction data of the shift register 24.

FIGS. 3A–3F and FIGS. 4A–4F show control-logic tables of the control circuit 26.

FIG. 3A shows a control-logic table in the case of a mode #0 or a mode #4. The mode #0 corresponds to a case in which the number of valid data items is zero, and the registers R1 through R8 do not hold valid data. The mode #4 corresponds to a case in which the number of valid data items is 4, and the registers R5 through R8 hold valid instruction data.

The control-logic table has rows thereof corresponding to various output-request numbers S0. Entries in each row represent register numbers or input-port numbers that serve as data sources to supply instruction data. At the top of the table, register numbers and output-port numbers are shown, indicating data destination to receive the instruction data. As a short notation, register numbers 1 through 8 represent registers R1 through R8, respectively.

The first row shows a case in which the output-request number SO (SO0 through SO3) is zero. In this row, a set of four entries in the field second from the left indicates that data of the registers R5 through R8 are supplied to and stored in the registers R1 through R4, respectively. A set of four entries in the field third from the left indicates that instruction data of the input ports DI0 through DI3 are supplied to and stored in the registers R5 through R8, respectively. A set of four entries in the field fourth from the left indicates that data of the registers R5 through R8 are supplied to and output from the output ports D0 through D3, respectively. The rightmost field shows that the full flags FF that are zero are output. This means that the full flags FF0 through FF3 are all zero, so that the registers R5 through R8 all have no instruction data left therein.

The second row shows a case in which the output-request number SO (SO0 through SO3) is 1. This row indicates that data of the registers R6, R7, R8, and R4 are supplied to and stored in the registers R1 through R4, respectively, and that instruction data of the input ports DI0 through DI3 are supplied to and stored in the registers R5 through R8, respectively. Further, it is indicated that data of the registers R5 through R8 are supplied to and output from the output ports D0 through D3, respectively, and that the full flags FF being zero are output.

The third row shows a case in which the output-request number SO (SO0 through SO3) is 2. This row indicates that data of the registers R7, R8, R3, and R4 are supplied to and stored in the registers R1 through R4, respectively, and instruction data of the input ports DI0 through DI3 are supplied to and stored in the registers R5 through R8, respectively. Further, it is indicated that data of registers R5 through R8 are supplied to and output from the output ports D0 through D3, respectively, and that the full flags FF being zero are output.

The fourth row shows a case in which the output-request number SO (SO0 through SO3) is 3. This row indicates that data of the registers R8, R2, R3, and R4 are supplied to and stored in registers R1 through R4, respectively, and that instruction data of the input ports DI0 through DI3 are supplied to and stored in the registers R5 through R8, respectively. Further, it is indicated that data of the registers R5 through R8 are supplied to and output from the output ports D0 through D3, respectively, and that the full flags FF being zero are output.

The fifth row shows a case in which the output-request number SO (SO0 through SO3) is 4. This row indicates that data of the registers R1, R2, R3, and R4 are supplied to and stored in the registers R1 through R4, respectively, and that instruction data of the input ports DI0 through DI3 are supplied to and stored in the registers R5 through R8, respectively. Further, the data of registers R5 through R8 are supplied to and output from the output ports D0 through D3, respectively, and that the full flags FF being zero are output.

FIG. 3B shows a control-logic table in the case of a mode #1. The mode #1 corresponds to a case in which the number of valid data items is 1, and the register R1 holds valid instruction data. The first row shows a case in which the output-request number SO (SO0 through SO3) is zero. This row indicates that data of the registers R1, R5, R6, and R7 are supplied to and stored in the registers R1 through R4, respectively, and that instruction data of the input ports DI0 through DI3 are supplied to and stored in the registers R5 through R8, respectively. Also, it is indicated that data of the registers R1, R5, R6, and R7 are supplied to and output from the output ports D0 through D3, respectively, and that the full flags FF being zero are output.

The second row shows a case in which the output-request number SO (SO0 through SO3) is 1. This row indicates that data of the registers R5, R6, R7, and RB are supplied to and stored in the registers R1 through R4, respectively, and that instruction data of the input ports DI0 through DI3 are supplied to and stored in the registers R5 through R8, respectively. Further, it is indicated that data of the registers R1, R5, R6, and R7 are supplied to and output from the output ports D0 through D3, respectively, and that the full flags FF being zero are output. For further information about what the third 15 through fifth rows indicate, relevant entries in the table of FIG. 3B should be referred to.

FIG. 3C shows a control-logic table of mode #2. The mode #2 corresponds to a case in which the number of valid data items is 2, and the registers R1 and R2 hold valid instruction data. The 20 first row shows a case in which the output-request number SO (SO0 through SO3) is zero. This row indicates that data of the registers R1, R2, R5, and R6 are supplied to and stored in the registers R1 through R4, respectively, and that instruction data of the input ports DI0 through DI3 are supplied to and stored in the registers R5 through R8, respectively. Also, it is indicated that data of the registers R1, R2, RS, and R6 are supplied to and output from the output ports D0 through D3, respectively, and the full figs FF being zero are output.

The second row shows when the output-request number SO (SO0 through SO3) is 1. This row indicates that data of the registers R2, R5, R6, and R7 are supplied to and stored in the registers R1 through R4, respectively, and that instruction data of the input ports DI0 through DI3 are supplied to and stored in the registers R5 through R8, respectively. Further, it is indicated that data of the registers R1, R2, R5, and R6 are supplied to and output from the output ports D0 through D3, respectively, and that full flags FF being zero are output. For further information about what the third through fifth rows indicate, relevant entries in the table of FIG. 3C should be referred to.

FIG. 3D shows the control-logic table of mode #3. Mode #3 corresponds to a case in which the number of valid data items is 3, and the registers RI, R2, and R3 hold valid instruction data. The first row shows when the output-request number SO (SO0 through SO3) is zero. This row indicates that data of the registers R1, R2, R3, and R5 are supplied to and stored in the registers R1 through R4, respectively, and instruction data of the input ports DI0 through DI3 are supplied to and stored in the registers R5 through R8, respectively. Also, it is indicated that data of the registers R1, R2, R3 and R5 are supplied to and output from the output ports D0 through D3, respectively, and that full flags FF being zero are output.

The second row shows a case in which the output-request number SO (SO0 through SO3) is 1. This row indicates that data of the registers R2, R3, R5, and R6 are supplied to and stored in the registers R1 through R4, respectively, and that instruction data of the input ports DI0 through DI3 are supplied to and stored in the registers R5 through R8, respectively. Further, it is indicated that data of the registers R1, R2, R3 and RS are supplied to and output from the output ports D0 through D3, respectively, and that the full flags FF being zero are output. For further information about what the third through fifth rows indicate, relevant entries in the table of FIG. 3D should be referred to.

FIG. 3E shows a control-logic table of mode #4. Mode #4 corresponds to a case where the number of valid data items is 4, and the registers R1, R2, R3 and R4 hold valid instruction data. It should be noted that positions of the valid data items are different from those of the mode #4 shown in FIG. 3A. The first row shows a case in which the output-request number SO (SO0 through SO3) is zero. This row indicates that data of the registers R1, R2, R3 and R4 are supplied to and stored in the registers R1 through R4, respectively, and that instruction data of the input ports DI0 through DI3 are supplied to and stored in the registers R5 through R8, respectively. Also, it is indicated that data of the registers R1, R2, R3 and R4 are supplied to and output from the output ports D0 through D3, respectively, and that full flags FF being zero are output.

The second row shows a case in which the output-request number SO (SO0 through SO3) is 1. This row indicates that data of the registers R2, R3, R4 and R5 are supplied to and stored in the registers R1 through R4, respectively, and that instruction data of the input ports DI0 through DI3 are supplied to and stored in the registers R5 through R8, respectively. Further, it is indicated that data of the registers R1, R2, R3 and R4 are supplied to and output from the output ports D0 through D3, respectively, and that full flags FF being zero are output. For further information about what the third through fifth rows indicate, relevant entries in the table of FIG. 3E should be referred to.

FIG. 3F shows a control-logic table of mode #5. Mode #5 corresponds to a case in which the number of valid data items is 5, and the registers R1, R2, R3, R4, and R8 hold valid instruction data. The first row shows a case when the output-request number SO (SO0 through SO3) is zero. This row indicates that data of the registers R1, R2, R3 and R4 are supplied to and stored in the registers R1 through R4, respectively, and that instruction data of the input ports DI0 through DI2 and the register R8 are supplied to and stored in the registers R5 through RB, respectively. Also, it is indicated that data of the registers R1, R2, R3 and R4 are supplied to and output from the output ports D0 through D3, respectively, and that full flag FF being one (i.e., the full flag FF3 being one indicating that the register R8 is full) is output.

The second row shows when the output-request number SO (SO0 through SO3) is 1. This row indicates that data of the registers R2, R3, R4, and R8 are supplied to and stored in the registers R1 through R4, respectively, and that instruction data of the input ports DI0 through DI3 are supplied to and stored in the registers R5 through R8, respectively. Further, it is indicated that data of the registers R1, R2, R3 and R4 are supplied to and output from the output ports D0 through D3, respectively, and that the full flags FF being zero are output. For further information about what the third through fifth rows indicate, relevant entries in the table of FIG. 3F should be referred to.

FIG. 4A shows a control-logic table of mode #6. The mode #6 corresponds to a case in which the number of valid data items is 6, and the registers R1, R2, R3, R4, R7 and R8 hold valid instruction data. The first row shows a case in which the output-request number SO (SO0 through SO3) is zero. This row indicates that data of the registers R1, R2, R3 and R4 are supplied to and stored in the registers R1 through R4, respectively, and that instruction data of the input ports DI0 and DI1 and the registers R7 and R8 are supplied to and stored in the registers R5 through R8, respectively. Also, it is indicated that data of the registers R1, R2, R3 and R4 are supplied to and output from the output ports D0 through D3, respectively, and that full flags FF being one (i.e., the full flags FF2 and FF3 being one indicating that the registers R7 and R8 are full) are output.

The second row shows a case in which the output-request number SO (SO0 through SO3) is 1. This row indicates that data of registers R2, R3, R4 and R7 are supplied to and stored in registers R1 through R4, respectively, and that instruction data of the input ports DI0 through DI2 and the register R8 are supplied to and stored in the registers R5 through R8, respectively. Further, it is indicated that data of registers R1, R2, R3 and R4 are supplied to and output from the output ports D0 through D3, respectively, and that full flag FF being one (i.e., the full flag FF3 being one indicating that the register R8 is full) is output. For further information about what the third through fifth rows indicate, relevant entries in the table of FIG. 4A should be referred to.

FIG. 4B shows a control-logic table of mode #7. Mode #7 corresponds to a case in which the number of valid data items is 7, and the registers R1, R2, R3, R4, R6, R7 and R8 hold valid instruction data. The first row shows a case when the output-request number SO (SO0 through SO3) is zero. This row indicates that data of registers R1, R2, R3 and R4 are supplied to and stored in registers R1 through R4, respectively, and that instruction data of the input port DI0 and the registers R6 through R8 are supplied to and stored in the registers R5 through R8, respectively. Also, it is indicated that data of registers R1, R2, R3 and R4 are supplied to and output from the output ports D0 through D3, respectively, and full flags FF being one (i.e., the full flags FF1 through FF3 being one indicating that the registers R6 through R8 are full) are output.

The second row shows a case in which the output-request number SO (SO0 through SO3) is 1. This row indicates that data of the registers R2, R3, R4, and R6 are supplied to and stored in registers R1 through R4, respectively, and instruction data of the input ports DI0 and DI1 and registers R7 and RB are supplied to and stored in registers R5 through R8, respectively. Further, it is indicated that data of registers R1, R2, R3 and R4 are supplied to and output from the output ports D0 through D3, respectively, and that full flags FF being one (i.e., the full flags FF2 and FF3 being one indicating that the registers R7 and R8 are full) are output. For further information about what the third through fifth rows indicate, relevant entries in the table of FIG. 4B should be referred to.

FIG. 4C shows a control-logic table in the case of a mode #8. Mode #8 corresponds to a case in which the number of valid data items is 8, and the registers R1, R2, R3, R4, R5, R6, R7 and R8 hold valid instruction data. The first row shows a case in which the output-request number SO (SO0 through SO3) is zero. This row indicates that data of the registers R1, R2, R3 and R4 are supplied to and stored in the registers R1 through R4, respectively, and that instruction data of the registers R5 through R8 are supplied to and stored in the registers R5 through R8, respectively. Also, it is indicated that data of the registers R1, R2, R3 and P4 are supplied to and output from the output ports D0 through D3, respectively, and that full flags FF being one (i.e., full flags FF0 through FF3 being one indicating that registers RS through R8 are full) are output.

The second row shows a case in which the output-request number SO (SO0 through SO3) is 1. This row indicates that data of registers R2, R3, R4 and R5 are supplied to and stored in registers R1 through R4, respectively, and that instruction data of the input port DI0 and the registers R6 through P8 are supplied to and stored in the registers R5 through R8, respectively. Further, it is indicated that data of registers R1, R2, R3 and R4 are supplied to and output from the output ports D0 through D3, respectively, and that full flags FF being one (i.e., full flags FF1 through FF3 being one indicating that registers R6 through R8 are full) are output. For further information about what the third through fifth rows indicate, relevant entries in the table of FIG. 4C should be referred to.

FIG. 4D shows a control-logic table of mode #5. Mode #5 corresponds to a case in which the number of valid data items is 5, and the registers R1, R5, R6, R7 and R8 hold valid instruction data. It should be noted that the positions of valid data items are different from those of the mode #5 shown in FIG. 3F. The first row shows a case in which the output-request number SO (SO0 through SO3) is zero. This row indicates that data of registers R1, R5, R6 and R7 are supplied to and stored in the registers R1 through R4, respectively, and that instruction data of the input ports DI0 through DI2 and the register R8 are supplied to and stored in the registers R5 through R8, respectively. Also, it is indicated that data of the registers R1, R5, R6 and R7 are supplied to and output from the output ports D0 through D3, respectively, and that full flag FF being one (i.e., full flag FF3 being one indicating that the register R8 is full) is output.

The second row shows a case in which the output-request number SO (SO0 through SO3) is 1. This row indicates that data of the registers R5, R6, R7, and R8 are supplied to and stored in the registers R1 through R4, respectively, and that instruction data of the input ports DI0 through DI3 are supplied to and stored in the registers R5 through R8, respectively. Further, it is indicated that data of the registers R1, R5, R6, and R7 are supplied to and output from the output ports D0 through D3, respectively, and that the full flags FF being zero are output. For further information about what the third through fifth rows indicate, relevant entries in the table of FIG. 4D should be referred to.

FIG. 4E shows a control-logic table of a mode #6. The mode #6 corresponds to a case in which the number of valid data items is 6, and the registers R1, R2, R5, R6, R7, and R8 hold valid instruction data. It should be noted that the positions of valid data items are different from those of the mode #6 shown in FIG. 4A. The first row shows a case in which the output-request number SO (SO0 through SO3) is zero. This row indicates that data of the registers R1, R2, R5, and R6 are supplied to and stored in the registers R1 through R4, respectively, and that instruction data of the input ports DI0 and DI1 and the registers R7 and R8 are supplied to and stored in the registers R5 through R8, respectively. Also, it is indicated that data of the registers R1, R2, R5, and R6 are supplied to and output from the output ports D0 through D3, respectively, and that the full flags FF being one (i.e., full flags FF2 and FF3 being one indicating that registers R7 and R8 are full) are output.

The second row shows a case in which the output-request number SO (SO0 through SO3) is 1. This row indicates that data of the registers R2, R5, R6, and R7 are supplied to and stored in the registers R1 through R4, respectively, and that instruction data of the input ports DI0 through DI2 and the register R8 are supplied to and stored in the registers R5 through R8, respectively. Further, it is indicated that data of the registers R1, R2, R5, and R6 are supplied to and output from the output ports D0 through D3, respectively, and that the full flag FF being one (i.e., full flag FF3 being one indicating that the register R8 is full) is output. For further information about what the third through fifth rows indicate, relevant entries in the table of FIG. 4E should be referred to.

FIG. 4F shows a control-logic table in the case of mode #7. The mode #7 corresponds to a case in which the number of valid data items is 7, and the registers R1, R2, R3, R5, R6, R7, and R8 hold valid instruction data. It should be noted that the positions of valid data items are different from those of the mode #7 shown in FIG. 4B. The first row shows a case in which the output-request number SO (SO0 through SO3) is zero. This row indicates that data of the registers R1, R2, R3, and R5 are supplied to and stored in the registers R1 through R4, respectively, and that instruction data of the input port DI0 and the registers R6 through R8 are supplied to and stored in the registers R5 through R8, respectively. Also, it is indicated that data of the registers R1, R2, R3, and R5 are supplied to and output from the output ports D0 through D3, respectively, and that the full flags FF being one (i.e., full flags FF1 through FF3 being one indicating that the registers R6 through R8 are full) are output.

The second row shows a case in which the output-request number SO (SO0 through SO3) is 1. This row indicates that data of the registers R2, R3, R5, and R6 are supplied to and stored in the registers R1 through R4, respectively, and that instruction data of the input ports DI0 and DI1 and the registers R7 and R8 are supplied to and stored in the registers R5 through R8, respectively. Further, it is indicated that data of the registers R1, R2, R3, and R5 are supplied to and output from the output ports D0 through D3, respectively, and that the full flags FF being one (i.e., full flags FF2 and FF3 being one indicating that the registers R7 and R8 are full) are output. For further information about what the third through fifth rows indicate, relevant entries in the table of FIG. 4F should be referred to.

Figure 5:
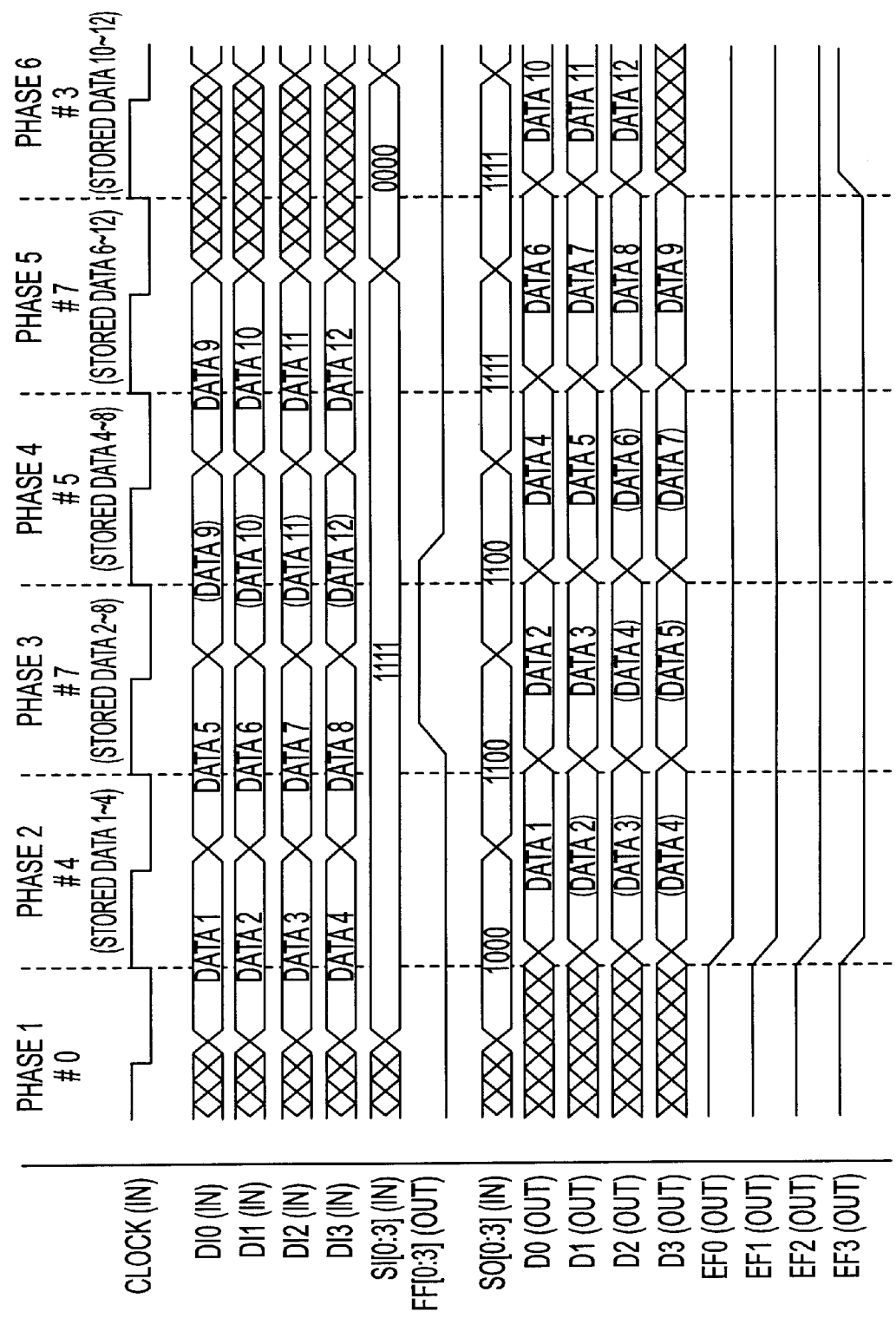
FIG. 5 is a timing chart for explaining the operation of the FIFO circuit of the present invention.

Following describes the operation of the FIFO circuit of FIG. 2 with respect to timing charts of FIG. 5.

As shown in a phase 1 of FIG. 5, initial settings are such that no valid data is held. In this case, empty flags EF0 through EF3 are all "1" so that the control-logic table of the mode #0 shown in FIG. 3A will be selected. Further, the input-request number is 4 (SI=1111), and the output-request number is 1 (SO=1000). In this case, the control circuit 26 controls in accordance with the conditions set forth in the second row of the control-logic table of the mode #0.

At a rising edge of a clock signal clock, instruction data (data 1 through 4) supplied to the input ports DI0 through DI3 are stored in the registers R5 through R8. The instruction data of the registers R5 through R8 are then supplied to the output ports D0 through D3, and the instruction data (data 1) is output from the output port D0 in accordance with the output-request number of 1. The selector circuit 22 is always controlled in advance to select the number of instruction data equal to the output-request number. Namely, no instruction data is output from the output ports D1 through D3 during phase 1.

Then, the operation enters a phase 2 in response to a rising edge of the clock signal clock. Since the instruction data are stored in the registers R5 through R8, the control-logic table of mode #4 (valid data positions: R5, R6, R7, and R8) shown in FIG. 3A is referred to. With the output-request number being one (SO=1000), the second row of the table is selected. As is prescribed in the second row, the contents of the registers R6 through R8 are moved to the registers R1 through R3, respectively, via the shifter 20. In the middle of the phase 2, external conditions are changed, with the new conditions being the output-request number is 2 (SO=1100), and four instruction data items (data 5 through 8) are supplied as input data.

In response to a rising edge of the clock signal clock, the operation enters a phase 3. Since valid instruction data are stored in the registers R1, R2, R3, R5, R6, R7, and R8, the control-logic table of mode #7 shown in FIG. 4F is referred to. With the output-request number being 2, the third row of the control-logic table of mode #7 is consulted, so that the contents of the registers R1 and R2 are output from the output ports D0 and D1 respectively. Further, the data of the register R3 is moved to the register R1, and the data of the registers R5 through R7 are moved to the registers R2 through R4, respectively, via the shifter 20. The data of the register R8 stays therein. In this embodiment, a data-output order is determined according to the register numbers. Because of this limitation, when the register R5 receives next instruction data, the contents of the register R5 is regarded as having been input before the contents of the register R8. In order to avoid this, the full flag FF being one is output to an exterior of the circuit, thereby invalidating the input-request-number signals SI0 through SI3 that are input to the circuit. After this, the output-request number is 2 (SO=1100), and four instruction data items (data 9 through 12) are input. In response to a rising edge of the clock signal clock, the operation enters a phase 4. Since valid instruction data are stored in the registers R1, R2, R3, R4, and R8, the control-logic table of mode #5 shown in FIG. 3F is referred to. With the output-request number being 2, the third row of the control-logic table of mode #5 is consulted, so that the contents of the registers R1 and R2 are output from the output ports D0 and D1, respectively. Further, the data of the registers R3, R4, and R8 are moved to the registers R1 through R3, respectively. The full flags FF in this case are zero.

In response to a rising edge of the clock signal clock, the operation enters a phase 5. Now that the full flags FF are zero, the registers R5 through R8 store therein instruction data (data 9 through 12) supplied to the input ports DI0 through DI3 wherein these data were stopped from being stored during the phase 4. Since valid instruction data are stored in the registers R1, R2, R3, R5, R6, R7, and R8, the control-logic table of mode #7 shown in FIG. 4F is referred to. With the output-request number being 4 (SO=1111) at this time, the fifth row of the control-logic table of mode #7 is consulted, so that the instruction data (data 6, 7, 8, 9) of the registers R1, R2, R3, and R5 are output from the output ports D0, D1, D2, and D3, respectively. Further, the data of the registers R6, R7, R8, and R4 (R4 being a dummy) are moved to the registers R1 through R4, respectively. The full flags FF in this case are zero.

Thereafter, the input-request number becomes zero (DI= 0000), and the output-request number remains to be 4 (SO=1111). As the operation enters a phase 6 in response to a rising edge of the clock signal clock, the control circuit 26 stores control data therein indicative of an invalid status of the registers R5 through R8. Since valid instruction data are stored in the registers R1, R2, and R3, the control-logic table of mode #3 shown in FIG. 3D is consulted. With the output-request number being 4, the fifth row of the control-logic table of mode #3 is referred to, and the contents of the registers R1, R2, R3, and R4 are output from the output ports D0, D1, D2, and D3, respectively. In this case, however, empty flags EF0, EF1, and EF2 being zero are output, indicating that the output data of the output ports D0, D1, and D2 are valid. Further, the empty flag EF3 being one is output, indicating that the output data of the output port D3 is invalid.

In this embodiment, the number of tri-state buffers connected to the input port D0 is 2, and the number of tri-state buffers connected to the input port D1 is 3. The number of tri-state buffers connected to the input port D2 is 4 and the number of tri-state buffers connected to the input port D3 is 5. This is a significant reduction in the numbers of tri-state buffers compared to the related-art configuration.

In this manner, the shifter 20 rearranges data supplied from the input register 18 so as to shift the data inside the shift register 24. Thus, the present invention can reduce the number of tri-state buffers connecting the input register 18 and the shift register 24 to the output ports D0 through D3 inside the selector circuit 22. As a result, parasitic capacitance of each of the output ports D0 through D3 is lowered to help to achieve high-speed operation.

Figure 6:
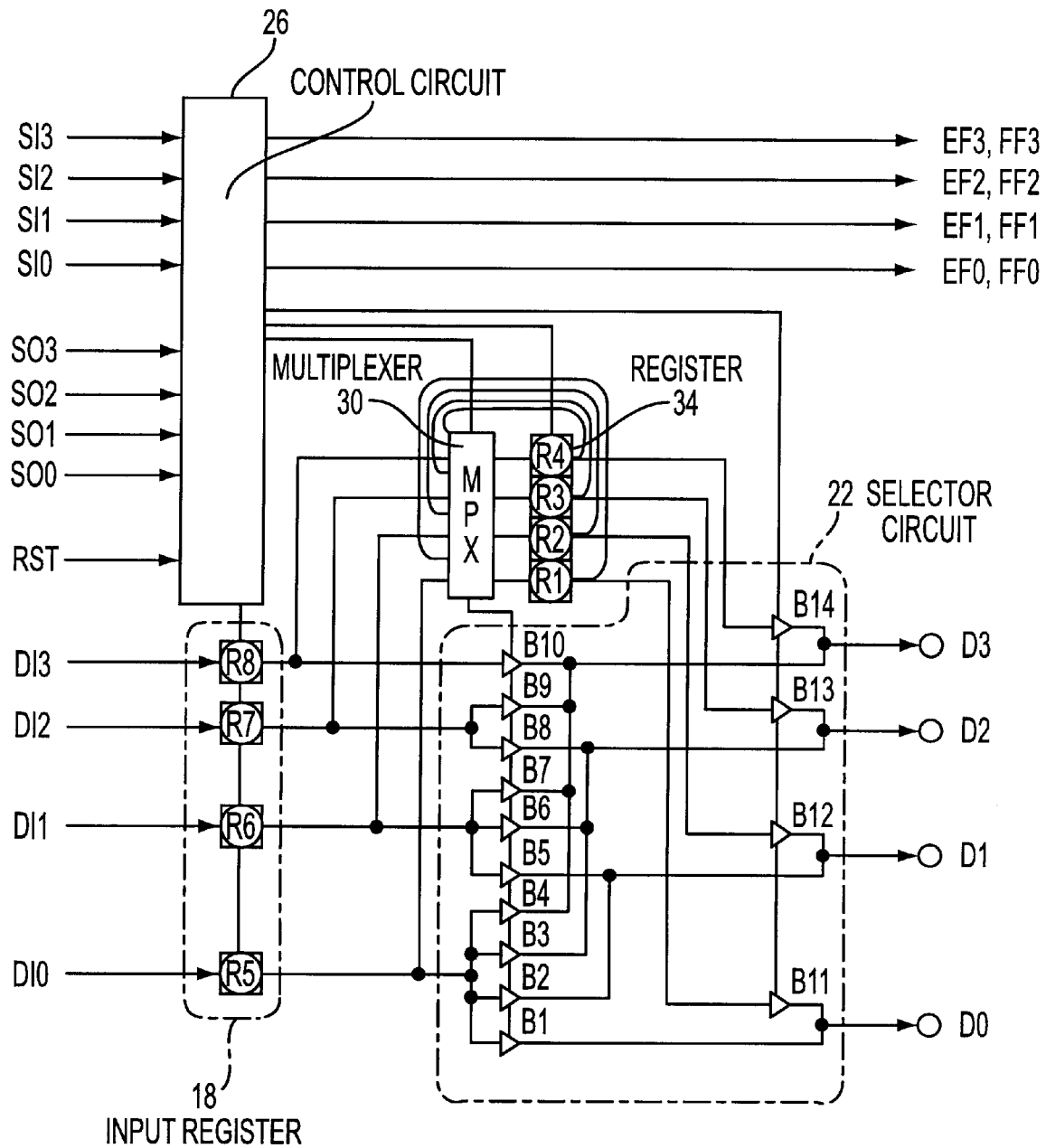
FIG. 6 is a block diagram of a second exemplary embodiment of a FIFO circuit according to the present invention.

FIG. 6 is a block diagram of another exemplary embodiment of a FIFO circuit according to the preset invention. In the figure, the same elements as those of FIG. 2 are referred to by the same numerals. In FIG. 6, instruction data coming to the input ports DI0 through DI3 are supplied to the registers R5 through R8, respectively. The registers R5 through R8 together form the input register 18, and each has a one-stage configuration.

The register R5 is connected to a multiplexer 30, and is connected to the output ports D0 through D3 via the respective tri-state buffers B1 through B4 provided in the selector circuit 22. The register R6 is connected to the multiplexer 30, and is connected to the output ports D1 through D3 via the respective tri-state buffers B5 through B7 provided in the selector circuit 22.

The register R7 is connected to the multiplexer 30, and is connected to the output ports D2 and D3 via the respective tri-state buffers B8 and B9 provided in the selector circuit 22. The register R8 is connected to the multiplexer 30, and is connected to the output port D3 via the tri-state buffer B10 provided in the selector circuit 22.

The multiplexer 30 receives instruction data from the registers R5 through R8 as well as from registers R1 through R4 of a register 34, and supplies the instruction data to the registers R1 through R4 after selecting the data. The registers R1 through R4 together forming the register 34 are each connected to the output ports D0 through D3, respectively, via the respective tri-state buffers B11 through B14 provided in the selector circuit 22.

The control circuit 26 has an internal status (valid data positions) thereof initialized by a reset signal RST provided from an external source, and controls valid data positions of the registers R1 through R8. Further, the control circuit 26 controls the writing of data in the registers R5 through R8, the shift operation of the multiplexer 30, the shift operation of the register 34, and the outputting operation of the tri-state buffers B1 through B14 of the selector circuit 22 based on input-request-number signals (number of data items) SI0 through SI3 and output-request-number signals (number of data items) SO0 through SO3 as well as based on the valid data positions. Through these controls, data items as many as the output-request number are output from the output ports D0 through D3. Further, the control circuit 26 generates empty flags EF0 through EF3 and full flags FF0 through FF3.

Here, data is output from the output port D0 when the output-request number is 1, and data is output from the output ports D0 and D1 when the output-request number is 2. By the same token, the output ports D0 through D2 output data when the output-request number is 3 and the output ports D0 through D3 output data when the output-request number is 4.

In this exemplary embodiment, the multiplexer 30 and the register 34 provide the same operation as the shifter 20 and the register 34 of first exemplary embodiment. Because of this, the control operation of the control circuit 26 is identical to that of the first exemplary embodiment, and is performed based on the control-logic tables shown in FIGS. 3A–3F and FIGS. 4A–4F.

In this exemplary embodiment, like the first exemplary embodiment, the number of tri-state buffers connected to the input port D0 is 2, and the number of tri-state buffers connected to the input port D1 is 3. The number of tri-state buffers connected to the input port D2 is 4 and the number of tri-state buffers connected to the input port D3 is 5. This is a significant reduction in the numbers of tri-state buffers compared to the related-art configuration.

In this manner, the multiplexer 30 rearranges data supplied from the input register 18 and the register 34. Thus, the present invention can reduce the number of buffers connecting the input register 18 and the register 34 to the output ports D0 through D3 inside the selector circuit 22. As a result, parasitic capacitance of each of the output ports D0 through D3 is lowered, helping to achieve high-speed operation.

Figure 7:
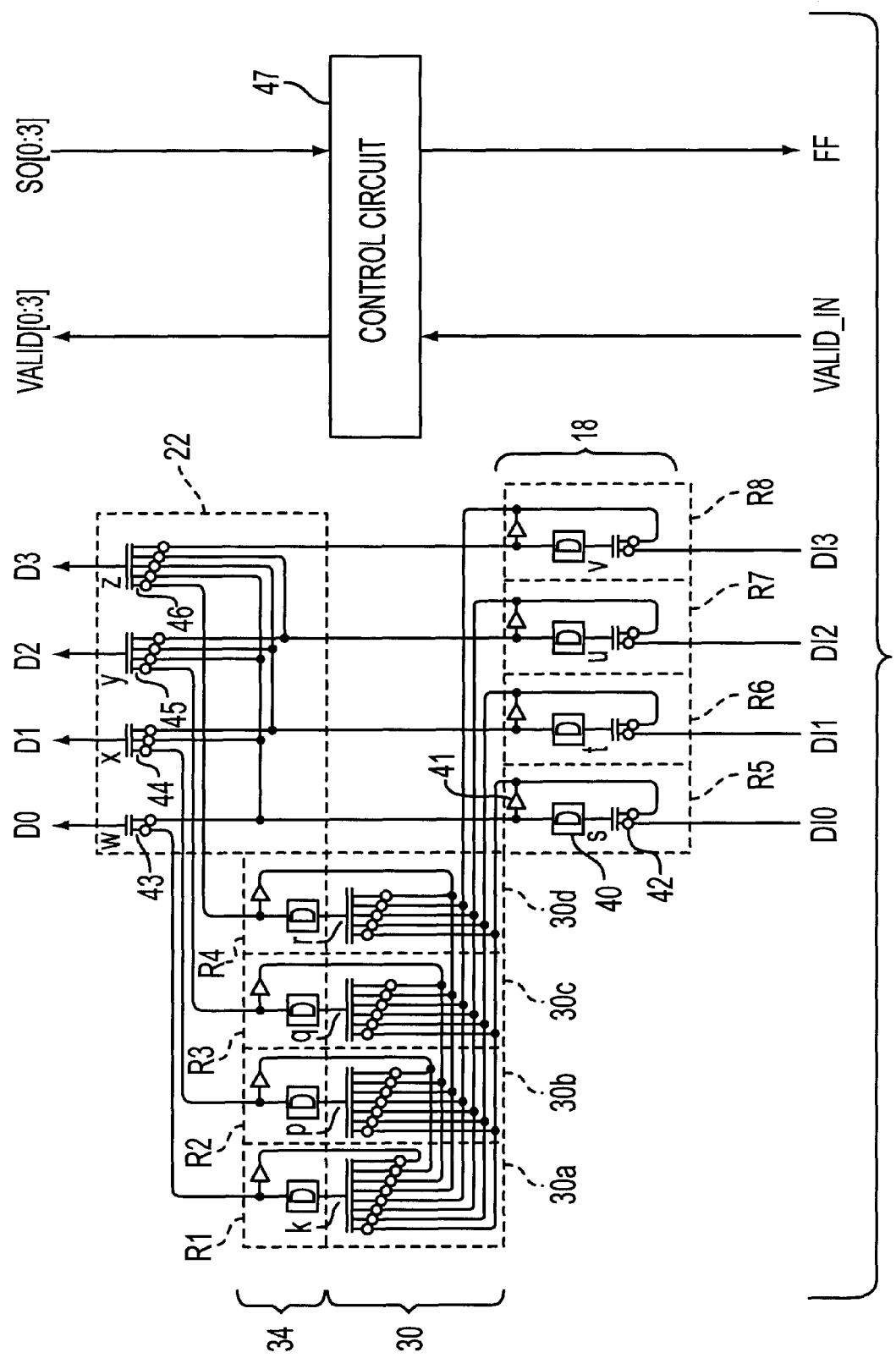
FIG. 7 is a block diagram of a third exemplary embodiment of a FIFO circuit according to the present invention.

FIG. 7 is a block diagram of a third exemplary embodiment of a FIFO circuit according to the present invention. In the figure, the same elements as those of FIG. 6 are referred to by the same numerals. In FIG. 7, instruction data coming to the input ports DI0 through DI3 are supplied to the registers R5 through R8, respectively. The registers R5 through R8 together form the input register 18, and each has a one-stage configuration.

Each of the registers R5 through R8 includes a D flip-flop 40 for latching data, a buffer 41 for looping back an output of the D flip-flop 40, and a multiplexer 42 for selecting data from the input port or data from the buffer 41.

The register R5 is connected to multiplexers 30a through 30d of the multiplexer 30, and is connected to the output ports D0 through D3 via respective demultiplexers 43 through 46 together forming the selector circuit 22. The register R6 is connected to the multiplexers 30a through 30d of the multiplexer 30, and is connected to the output ports D1 through D3 via the respective multiplexers 33 through 36 of the selector circuit 22.

The register R7 is connected to the multiplexers 30a through 30d of the multiplexer 30, and is connected to the output ports D2 and D3 via the respective demultiplexers 45 and 46 of the selector circuit 22. The register R8 is connected to the multiplexers 30a through 30d of the multiplexer 30, and is connected to the output port D3 via the multiplexer 46 of the selector circuit 22.

The multiplexer 30 is comprised of the multiplexers 30a through 30d corresponding to the respective registers R1 through R4 of the register 34. The multiplexer 30 selects instruction data supplied from the registers R5 through R8 and the registers R1 through R4 of the register 34, and supplies the selected data to the registers R1 through R4 of the register 34. The registers R1 through R4 of the register 34 are connected to the output ports D0 through D3, respectively, via the respective multiplexers 43 through 46 provided in the selector circuit 22. Each of the multiplexers 43 through 46 selects a signal under the control of a control circuit 47, and outputs the selected signal from a corresponding one of the output ports D0 through D3. Control-logic tables that the control circuit 47 uses are the same as those of FIGS. 3A–3F and FIGS. 4A–4F. Namely, the multiplexer 42 of the registers R5 through R8 makes a selection according to entries provided in the field third form the left in a relevant table. Further, the multiplexers 30a through 30d make a selection according to entries provided in the field second from the left, and the multiplexers 43 through 46 make a selection according to entries provided in the field fourth from the left.

Figure 8:
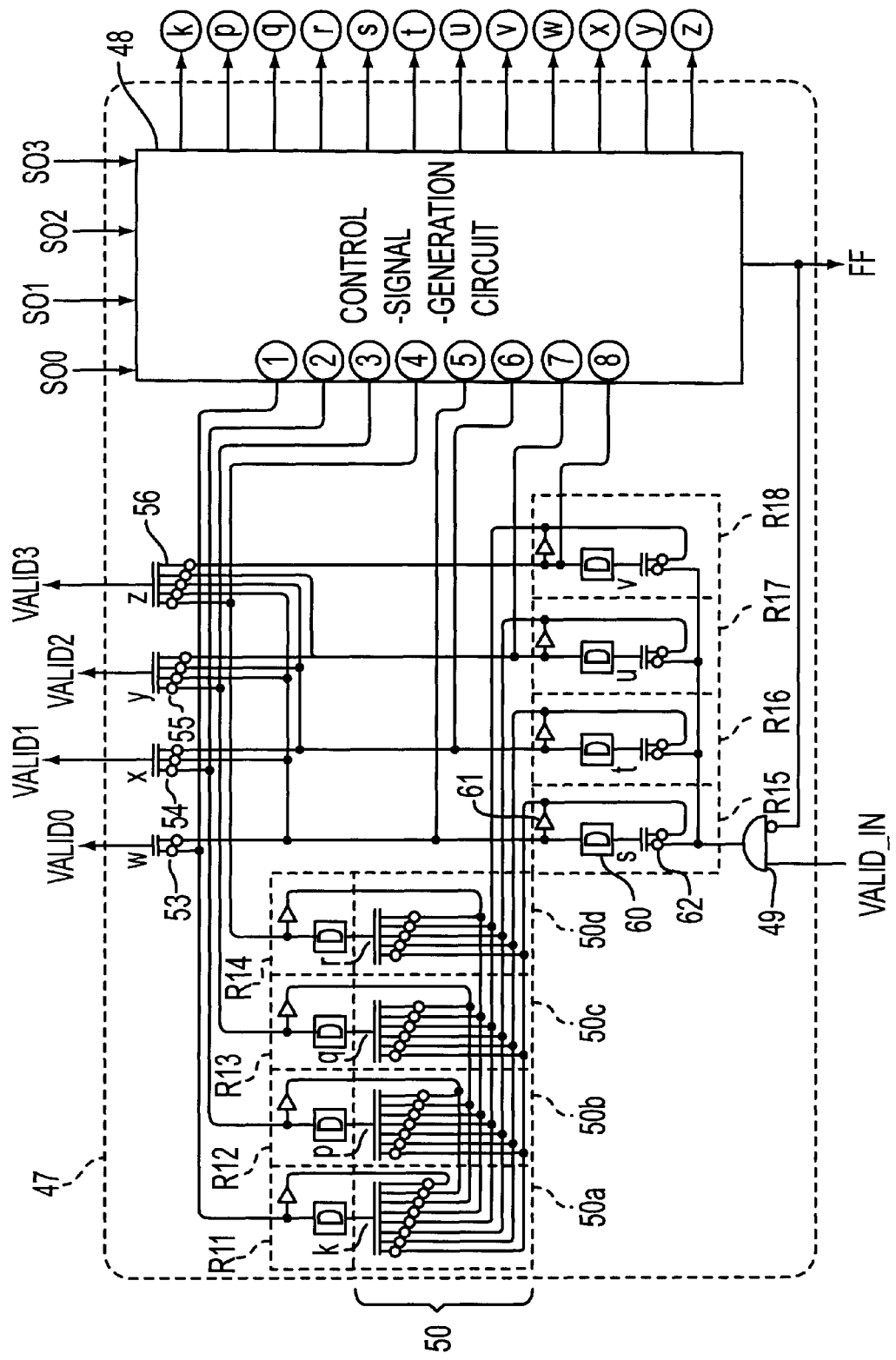
FIG. 8 is a block diagram of an exemplary embodiment of the control circuit 47.

FIG. 8 is a block diagram of an exemplary embodiment of the control circuit 47. In the figure, a signal valid in, which indicates a valid status of input data when it is 1, is supplied to an AND circuit 49. The AND circuit 49 performs an AND operation between the signal valid_in and an inverse of a full flag FF that is supplied from a control-signal-generation unit 48. An output of the AND circuit 49 is supplied to registers R15 through R18, which have a configuration parallel to that of the registers R5 through R8. Each of the registers R15 through R18 includes a D flip-flop 60 for latching data, a buffer 61 for looping back an output of the D flip-flop 60, and a multiplexer 62 for selecting data from an input port or data from the buffer 61.

The register R15 is connected to multiplexers 50a through 50d of a multiplexer 50, and is connected to multiplexers 53 through 56 together forming a selector circuit. The register R16 is connected to the multiplexers 50a through 50d, and is connected to the three multiplexers 54 through 56. The register R17 is connected to the multiplexers 50a through 50d, and is connected to the two multiplexers 55 and 56. The register R18 is connected to the multiplexers 50a through 50d, and is connected to the multiplexer 56.

The multiplexer 50 is comprised of the multiplexers 50a through 50d corresponding to respective registers R11 through R14. The multiplexer 50 selects instruction data supplied from the registers R15 through R18 and the registers R11 through R14, and supplies the selected data to the registers R11 through R14. The registers R11 through R14 are connected to the respective multiplexers 53 through 56. Each of the multiplexers 53 through 56 selects a signal under the control of the control-signal-generation unit 48, and outputs a corresponding one of valid-data-position signals valid0 through valid3. Control-logic tables that the control-signal-generation unit 48 uses are the same as those of FIGS. 3A–3F and FIGS. 4A–4F. Namely, the multiplexer 62 of the registers R15 through R18 makes a selection according to entries provided in the field third from the left in a relevant table. Further, the multiplexers 50a through 50d make a selection according to entries provided in the field second from the left, and the multiplexers 53 through 56 make a selection according to entries provided in the field fourth from the left.

Figure 9:
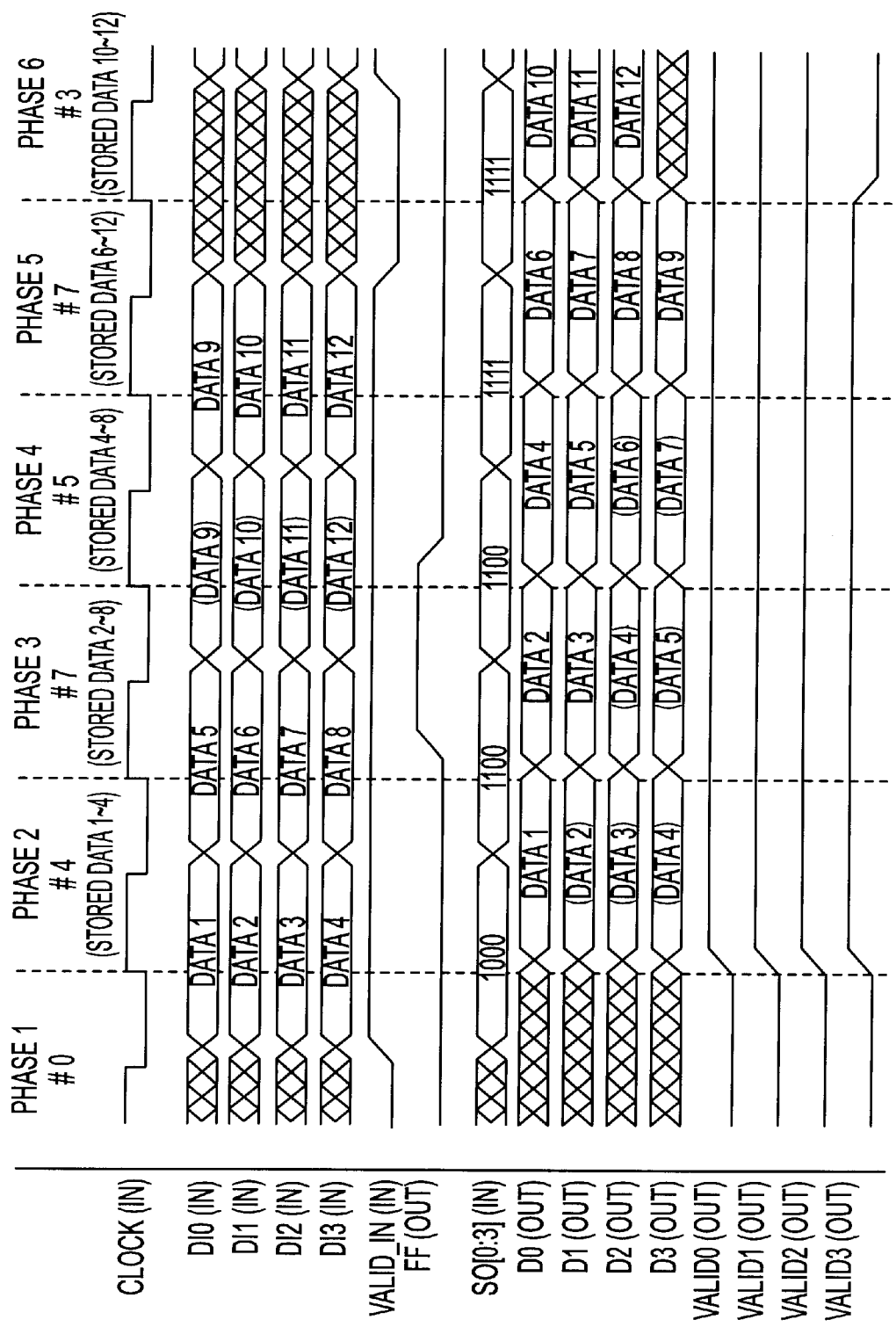
FIG. 9 is a timing chart for explaining operation of the FIFO circuit of the present invention.

Following describes the operation of the FIFO circuit of FIG. 7 with reference to the timing chart of FIG. 9.

As illustrated in a phase 1 of FIG. 9, initial settings are such that no valid data is held. In this case, valid0 through valid3 are all zero, so that the control-logic table of the mode #0 shown in FIG. 3A will be selected. Further, the output-request number is 1 (SO=1000), so that the control circuit attends to control in accordance with the conditions set forth in the second row of the control-logic table of the mode #0.

At a rising edge of a clock signal clock after the signal valid_in indicative of valid data input becomes 1, instruction data (data 1 through 4) supplied to the input ports DI0 through DI3 are stored in the registers R5 through RB. The instruction data of the registers R5 through R8 are then supplied to the output ports D0 through D3, and the instruction data (data 1) is output from the output port D0 in accordance with the output-request number of 1. The selector circuit is always controlled in advance to select the number of instruction data items equal to the output-request number. Namely, no instruction data is output from the output ports D1 through D3 during the phase 1.

Then, the operation enters a phase 2 in response to a rising edge of the clock signal clock. Since the instruction data are stored in the registers R5 through R8, the control-logic table of the mode #4 (valid data positions: R5, R6, R7, and R8) shown in FIG. 3A is referred to. With the output-request number being one (SO=1000), the second row of the table is selected. As is illustrated in the second row, the contents of the registers R6 through R8 are moved to the registers R1 through R3, respectively. In the middle of the phase 2, external conditions are changed, with the new conditions being that the output-request number is 2 (SO=1100), and four instruction data items (data 5 through 8) are supplied as input data.

In response to a rising edge of the clock signal clock, the operation enters a phase 3. Since valid instruction data are stored in the registers R1, R2, R3, R5, R6, R7, and R8, the control-logic table of the mode #7 shown in FIG. 4F is referred to. With the output-request number being 2, the third row of the control-logic table of mode #7 is consulted, so that the contents of the registers R1 and R2 are output from the output ports D0 and D1, respectively. Further, the data of the register R3 is moved to the register R1 and the data of the registers R5 through R7 are moved to the registers R2 through R4, respectively. The data in the register R8 stays therein. In this embodiment, a data-output order is determined according to the register numbers. Because of this limitation, when the register R5 receives next instruction data, the contents of the register R5 is regarded as having been input before the contents of the register R8. In order to avoid this, the full flag FF being one is output to an exterior of the circuit, thereby invalidating the valid-data-indication signal valid in.

After this, the output-request number is 2 (SO=1100), and four instruction data items (data 9 through 12) are input. In response to a rising edge of the clock signal clock, the operation enters a phase 4. Since valid instruction data are stored in the registers R1, R2, R3, R4, and R8, the control-logic table of the mode #5 shown in FIG. 3F is referred to. With the output-request number being 2, the third row of the control-logic table of the mode #5 is consulted, so that the contents of the registers R1 and R2 are output from the output ports D0 and D1, respectively. Further, the data of the registers R3, R4, and R8 are moved to the registers R1 through R3, respectively. The full flags FF in this case are zero.

In response to a rising edge of the clock signal clock, the operation enters a phase 5. Now that the full flags FF are zero, the registers R5 through R8 store therein instruction data (data 9 through 12) supplied to the input ports DI0 through DI3 wherein these data were stopped from being stored during the phase 4. Since valid instruction data are stored in the registers R1, R2, R3, R5, R6, R7, and R8, the control-logic table of the mode #7 shown in FIG. 4F is referred to. With the output-request number being 4 (SO= 1111) at this time, the fifth row of the control-logic table of the mode #7 is consulted, so that the instruction data (data 6, 7, 8, 9) of the registers R1, R2, R3, and R5 are output from the output ports D0, D1, D2, and D3, respectively. Further, the data of the registers R6, R7, R8, and R4 (R4 being a dummy) are moved to the registers R1 through R4, respectively. The full flags FF in this case are zero.

Thereafter, the valid-input-indication signal valid_in becomes zero, and the output-request number remains 4 (SO=1111). As the operation enters a phase 6 in response to a rising edge of the clock signal clock, the control circuit stores control data therein indicative of an invalid status of the registers R5 through R8. Since valid instruction data are stored in the registers R1, R2, and R3, the control-logic table of the mode #3 shown in FIG. 3D is consulted. With the output-request number being 4, the fifth row of the control-logic table of the mode #3 is referred to, and the contents of the registers R1, R2, R3, and R4 are output from the output ports D0, D1, D2, and D3, respectively. In this case, however, the signals valid0, valid1, and valid2 being one are output, indicating that the output data of the output ports D0, D1, and D2 are valid. Further, the signal valid3 being zero is output, indicating that the output data of the output port D3 is invalid.

In this third exemplary embodiment, like the second exemplary embodiment, the multiplexer 30 rearranges and shifts data supplied from the input register 18. Thus, the present invention can reduce the number of buffers connecting the input register 18 and the register 34 to the output ports D0 through D3 inside the selector circuit 22. As a result, parasitic capacitance of each of the output ports D0 through D3 is lowered, helping to achieve high-speed operation.

Figure 10:
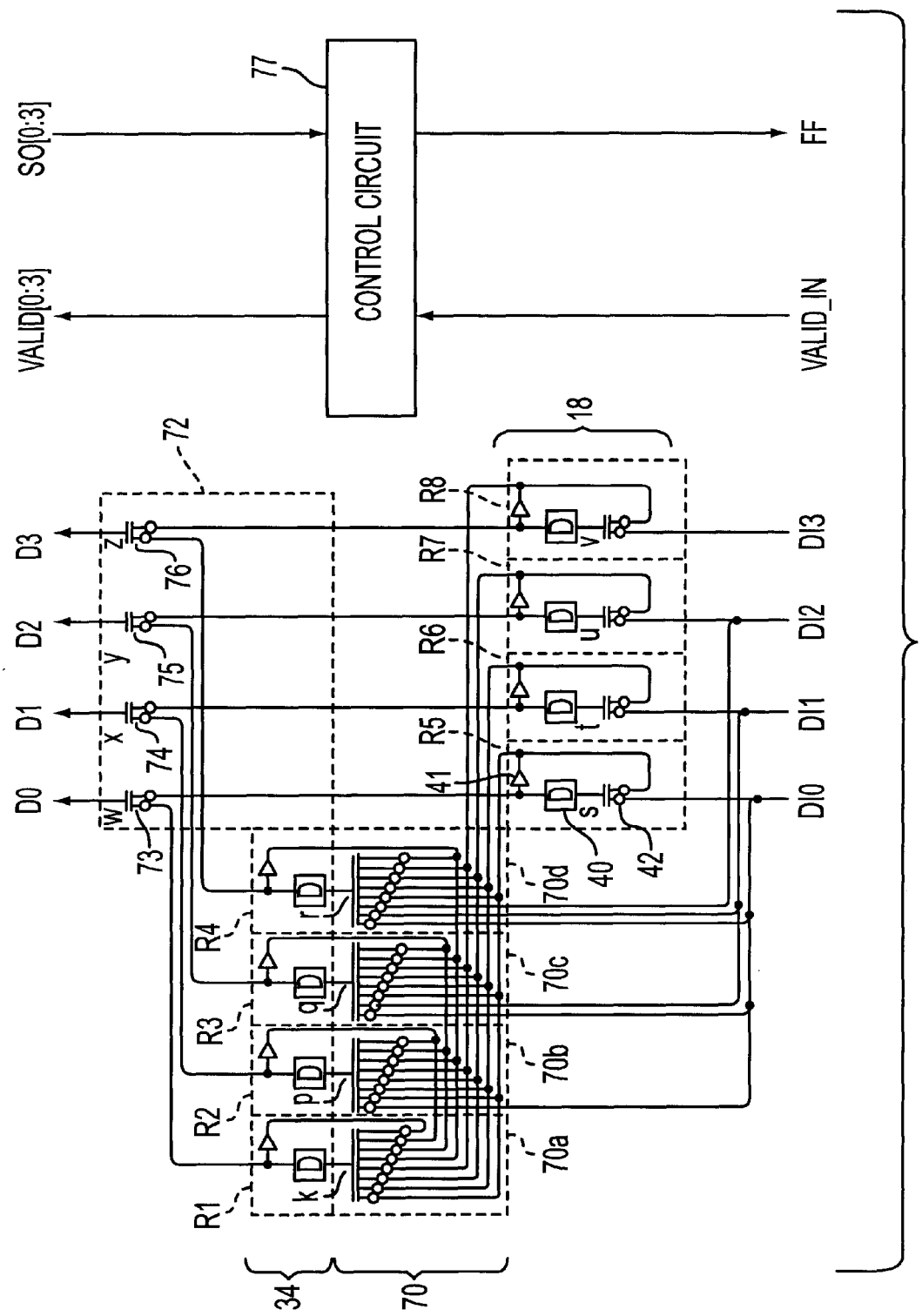
FIG. 10 is a block diagram of a fourth exemplary embodiment of a FIFO circuit according to the present invention.

FIG. 10 is a block diagram of a fourth exemplary embodiment of a FIFO circuit according to the present invention. In the figure, the same elements as those of FIG. 7 are referred to by the same numerals. In FIG. 10, instruction data coming to the input ports DI0 through DI3 are supplied to the registers R5 through R8, respectively. The registers R5 through R8 together form the input register 18 each has a one-stage configuration. The instruction data input to the input port DI0 is supplied to multiplexers 70b through 70d that form part of a multiplexer 70. Further, the instruction data of the input port DI1 is supplied to the multiplexers 70c and 70d, and the instruction data of the input port DI2 is supplied to the multiplexer 70d.

Each of the registers R5 through R8 includes the D flipflop 40 for latching data, the buffer 41 for looping back an output of the D flip-flop 40, and the multiplexer 42 for selecting data from the input port or data from the buffer 41. The register R5 is connected to the multiplexers 70a through 70d of the multiplexer 70, and is connected to a multiplexer 73 forming part of a selector circuit 72. The register R6 is connected to the multiplexers 70a through 70d of the multiplexer 70, and is connected to the multiplexer 74 provided in the selector circuit 72.

The register R7 is connected to the multiplexers 70a through 70d of the multiplexer 70, and is connected to the multiplexer 75 of the selector circuit 72. The register R8 is connected to multiplexers 70a through 70d of the multiplexer 70, and is connected to the multiplexer 76 of selector circuit 72.

Multiplexer 70 is comprised of the multiplexers 70a through 70d corresponding to the respective registers R1 through R4 of the register 34. The multiplexer 70 selects instruction data supplied from the input ports DI0 through DI2, the registers R5 through R8, and the registers R1 through R4 of the register 34, and supplies the selected data to the registers R1 through R4 of the register 34. The registers R1 through R4 of the register 34 are connected to the output ports D0 through D3, respectively, via the respective multiplexers 73 through 76 provided in the selector circuit 72. Each of the multiplexers 73 through 76 selects a signal under the control of a control circuit 77, and outputs the selected signal from a corresponding one of the output ports D0 through D3. Control-logic tables used by the control circuit 77 are shown in FIGS. 12A–12E and FIGS. 13A–13E. These control-logic tables are provided in the same format as those of FIGS. 3A–3F and FIGS. 4A–4F. Namely, the multiplexer 42 of the registers R5 through R8 makes a selection according to entries provided in the field third from the left in a relevant table. Further, the multiplexers 70a through 70d make a selection according to entries provided in the field second from the left, and the multiplexers 73 through 76 make a selection according to entries provided in the field fourth from the left. Also, table entries of zero such as those found in the field third from the left in the table of FIG. 12B indicate no data changes.

Figure 11:
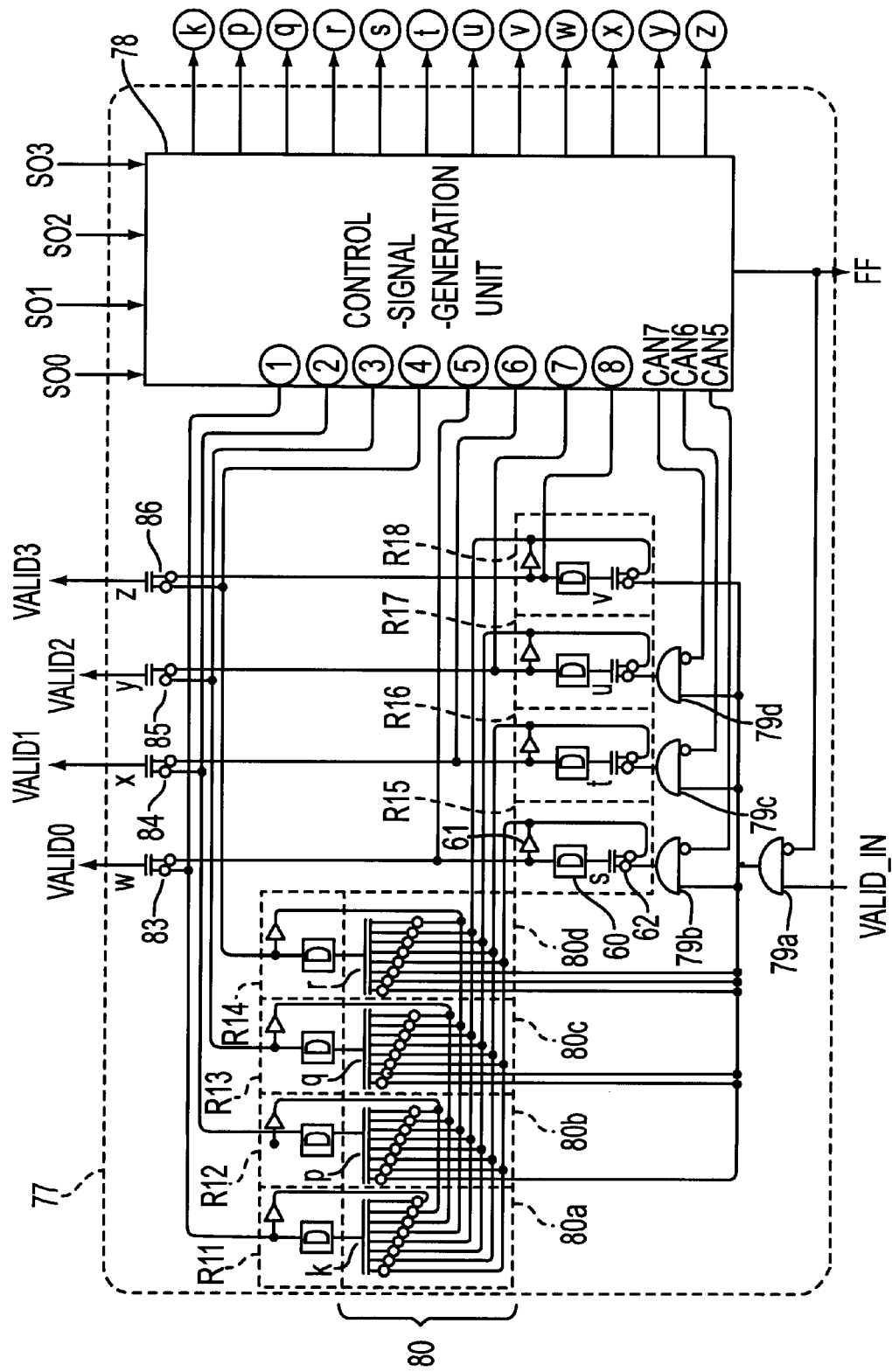
FIG. 11 is a block diagram of an exemplary embodiment of the control circuit 77.

FIG. 11 is a block diagram of an exemplary embodiment of the control circuit 77. In the figure, a signal valid_in, which indicates a valid status of input data when it is 1, is supplied to an AND circuit 79a. The AND circuit 79a performs an AND operation between the signal valid_in and an inverse of a full flag FF that is supplied from a control-signal-generation unit 78. An output of the AND circuit 79a is supplied to registers R15 through R17 via AND circuits 79b through 79d, respectively, and, also, is supplied to a register R18 directly without having an intervening AND circuit. The AND circuits 79b through 79d receive signals CAN5 through CAN7, respectively, from the control-signalgeneration unit 78. Each of the registers R15 through R18 includes the D flip-flop 60 for latching data, the buffer 61 for looping back an output of the D flip-flop 60, and the multiplexer 62 for selecting data from an input port or data from the buffer 61.

The register R15 is connected to multiplexers 80a through 80d of a multiplexer 80, and is connected to a multiplexer 83 serving as a selector circuit. The register R16 is connected to the multiplexers 80a through 80d, and is connected to a multiplexer 84. The register R17 is connected to the multiplexers 80a through 80d, and is connected to a multiplexer 85. The register R18 is connected to the multiplexers 80a through 80d, and is connected to a multiplexer 86.

The multiplexer 80 comprises multiplexers 80a through 80d corresponding to respective registers R11 through R14. The multiplexer 80 selects instruction data supplied from the registers R15 through R18 and the registers R11 through R14, and supplies the selected data to the registers R11 through R14. The registers R11 through R14 are connected to the respective multiplexers 83 through 86. Each of the multiplexers 83 through 86 selects a signal under the control of the control-signal-generation unit 78, and outputs a corresponding one of the valid-data-position signals vali0d through valid3. Control-logic tables used by the control-signal-generation unit 78 are the same as those of FIGS. 12A–12E and FIGS. 13A–13E. Namely, the multiplexer 62 of the registers R15 through R18 makes a selection according to entries provided in the field third from the left in a relevant table. Further, the multiplexers 80a through 80d make a selection according to entries provided in the field second from the left, and the multiplexers 83 through 86 make a selection according to entries provided in the field fourth from the left.

If the number of data items stored in the registers 18 and 34 exceeds the number of output ports, instruction data is stored in the register 18. In order to maintain a correct data-output order in relation to previous input data, the multiplexer 70 stores the data of the register 18 in the register 34 by arranging the data to follow valid data already stored in the register 34. If the register 34 becomes full, data that is late in an order of data output is left in the register 18. The selector circuit 72 selects data from the register 34 in the order of data output and outputs the selected data. If the number of data items stored in the register 34 is below the number of the output ports, input data is stored in the register 34 by the multiplexer 70 such that the input data comes after the valid data already stored in the register 34. This maintains a correct order of data output in relation to the previous input data. If the register 34 becomes full, the data that is late in the order of data output is stored in the register 18.

Following describes the operation of the FIFO circuit of FIG. 10 with reference to the timing chart of FIG. 9.

As shown in a phase 1 of FIG. 9, initial settings are such that no valid data is held. In this case, valid0 through valid3 are all zero, so that the control-logic table of the mode #0 shown in FIG. 12A will be selected. Further, the output-request number is 1 (SO=1000), so that the control circuit controls in accordance with the conditions set forth in the second row of the control-logic table of the mode #0.

At a rising edge of a clock signal clock after the signal valid_in indicative of valid data input becomes 1, instruction data (data 1 through 4) supplied to the input ports DI0 through DI3 are stored in the registers R5 through R8. The instruction data of the registers R5 through R8 are then supplied to the output ports D0 through D3, and the instruction data (data 1), is output from the output port D0 in accordance with the output-request number of 1. The selector circuit is always controlled in advance to select as many instruction data items as the output-request number. Namely, no instruction data is output from the output ports D1 through D3 during the phase 1.

Then, the operation enters a phase 2 in response to a rising edge of the clock signal clock. Since the instruction data are stored in the registers R5 through R8, the control-logic table of the mode #4 (valid data positions: R5, R6, R7, and R8) shown in FIG. 12A is referred to. With the output-request number being one (SO=1000), the second row of the table is selected. As is described in the second row, the contents of the registers R6 through R8 are moved to the registers R1 through R3, respectively. The data coming to the register R5 is directed to the register R4, so that the signal CAN5 invalidates the data of the register R5. In the middle of the phase 2, external conditions are changed, with the new conditions being the output-request number is 2 (SO=1100) and four instruction data items (data 5 through 8) are supplied as input data.

In response to a rising edge of the clock signal clock, the operation enters a phase 3. Since valid instruction data are stored in the registers R1, R2, R3, R5, R6, R7, and R8, the control-logic table of the mode #7 shown in FIG. 13D is referred to. With the output-request number being 2, the third row of the control-logic table of the mode #7 is consulted, so that the contents of the registers R1 and R2 are output from the output ports D0 and D1, respectively. Further, the data of the register R3 is moved to the register R1 and the data of the registers R5 through R7 are moved to the registers R2 through R4, respectively. The data in the register R8 stays therein. In this embodiment, a data-output order is determined according to the register numbers. Because of this limitation, when the register R5 receives next instruction data, the contents of the register R5 is regarded as having been input before the contents of the register R8. In order to avoid this, the full flag FF being one is output to an exterior of the circuit, thereby invalidating the valid-data-indication signal valid in.

After this, the output-request number is 2 (SO=1100) and four instruction data items (data 9 through 12) are input. In response to a rising edge of the clock signal clock, the operation enters a phase 4. Since valid instruction data are stored in the registers R1, R2, R3, R4, and R8, the control-logic table of the mode #5 shown in FIG. 13B is referred to. With the output-request number being 2, the third row of the control-logic table of the mode #5 is consulted, so that the contents of the registers R1 and R2 are output from the output ports D0 and D1, respectively. Further, the data of the registers R3, R4, and R8 are moved to the registers R1 through R3, respectively. The full flags FF in this case are zero.

In response to a rising edge of the clock signal clock, the operation enters a phase 5. Now that the full flags FF are zero, the registers R5 through R8 store therein instruction data (data 9 through 12) supplied to the input ports DI0 through DI3 wherein these data were stopped from being stored during the phase 4. Since valid instruction data are stored in the registers R1, R2, R3, R5, R6, R7, and R8, the control-logic table of the mode #7 shown in FIG. 13D is referred to. With the output-request number being 4 (SO= 1111) at this time, the fifth row of the control-logic table of the mode #7 is consulted, so that the instruction data (data 6. 7, 8, 9) of the registers R1, R2, R3, and R5 are output from the output ports D0, D1, D2, and D3, respectively. Further, the data of the registers R6, R7, R8, and R4 (R4 being a dummy) are moved to the registers R1 through R4, respectively. The full flags FF in this case are zero.

Thereafter, the valid-input-indication signal valid_in, becomes zero, and the output-request number remains 4 (SO=1111). As the operation enters a phase 6 in response to a rising edge of the clock signal clock, the control circuit stores control data therein indicative of an invalid status of the registers R5 through R8. Since valid instruction data are stored in the registers R1, R2, and R3, the control-logic table of the mode #3 shown in FIG. 12E is consulted. With the output-request number being 4, the fifth row of the control-logic table of the mode #3 is referred to, and the contents of the registers R1, R2, R3, and R4 are output from the output ports D0, D1, D2, and D3, respectively. In this case, however, the signals valid0, valid1, and valid2 being one are output, indicating that the output data of the output ports D0, D1, and D2 are valid. Further, the signal valid3 being zero is output, indicating that the output data of the output port D3 is invalid.

In this fourth exemplary embodiment, the circuit configuration is such that the selector circuit 72 selects data to be output from the output ports D0 through D3 between the register 34 and the input register 18. Such a choice between two alternatives reduces the load on the output signals, thereby providing a circuit suitable for high-speed operation. It should be noted, however, that the load on the input signals of the multiplexer 70 is heavier than in the third embodiment.

Figure 14:
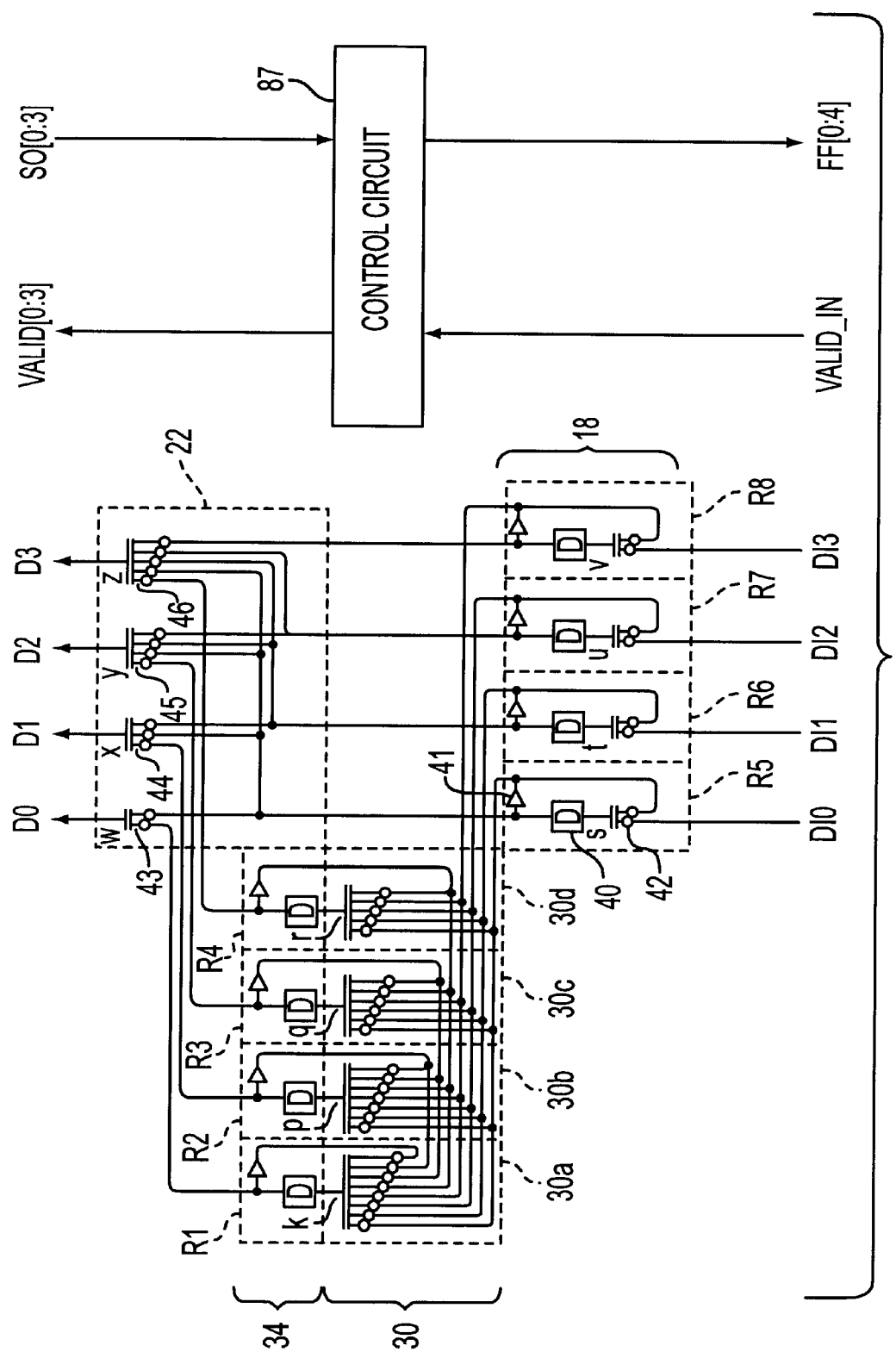
FIG. 14 is a block diagram of a fifth exemplary embodiment of a FIFO circuit according to the present invention.

FIG. 14 is a block diagram of a fifth exemplary embodiment of a FIFO circuit according to the present invention. The configuration of FIG. 14 differs from that of FIG. 7 only in that a control circuit 87 is used in place of the control circuit 47. In FIG. 14, the same elements as those of FIG. 7 are referred to by the same numerals, and a description thereof will be omitted. Control-logic tables used by the control circuit 87 are shown in FIGS. 16A–16F, FIGS. 17A–17F, FIGS. 18A–18F, and FIGS. 19A–19F. Namely, the multiplexer 42 of the registers R5 through R8 makes a selection as required by entries provided in the field third from the left in a relevant table. Further, the multiplexers 30a through 30d make a selection according to entries provided in the field second from the left and the multiplexers 43 through 46 make a selection according to entries provided in the field fourth from the left.

Figure 15:
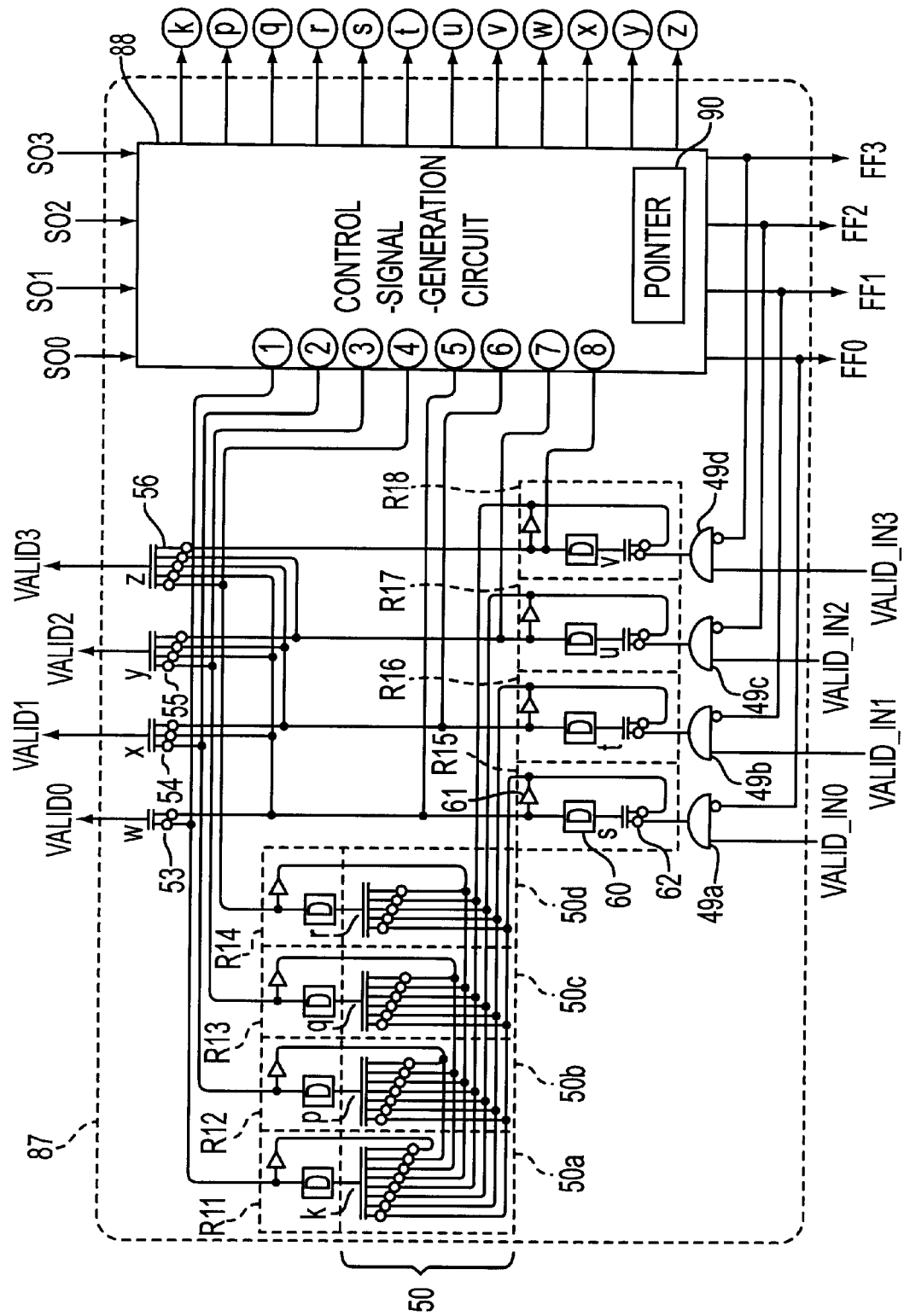
FIG. 15 is a block diagram of an exemplary embodiment of the control circuit 87.

FIG. 15 is a block diagram of an exemplary embodiment of the control circuit 87. Differences between FIG. 15 and FIG. 9 are that full flags FF0 through FF3 are provided to indicate a status of the registers R5 through R8, and that signals valid_in0 through valid_in3, are provided to make it possible to individually invalidate signals indicative of valid data input when the registers R5 through R8 are full.

In FIG. 15, the signals valid_in0 through valid_in3, each of which indicates a valid status of input data when it is 1, are supplied to AND circuits 49a through 49d, respectively. The AND circuit 49a through 49d perform an AND operation between the signals valid_in0 through valid_in3 and inverses of full flags FF0 through FF3 that are supplied from a control-signal-generation unit 88. Outputs of the AND circuits 49a through 49d are supplied to the registers R15 through R18, respectively. Each of the registers R15 through R18 includes the D flip-flop 60 for latching data, the buffer 61 for looping back an output of the D flip-flop 60, and the multiplexer 62 for selecting data from an input port or data from the buffer 61.

The register R15 is connected to the multiplexers 50a through 50d of the multiplexer 50 and is connected to the multiplexers 53 through 56 serving as a selector circuit. The register R16 is connected to the multiplexers 50a through 50d, and is connected to the three multiplexers 54 through 56.

The register R17 is connected to the multiplexers 50a through 50d, and is connected to the two multiplexers 55 and 56. The register R18 is connected to the multiplexers 50a through 50d, and is connected to the multiplexer 56.

The multiplexer 50 comprises the multiplexers 50a through 50d corresponding to the respective registers R11 through R14. The multiplexer 50 selects instruction data supplied from the registers R15 through R18 and the registers R11 through R14, and supplies the selected data to the registers R11 through R14. The registers R11 through R14 are connected to the respective multiplexers 53 through 56. Each of the multiplexers 53 through 56 selects a signal under the control of the control-signal-generation unit 88, and outputs a corresponding one of valid-data-position signals valid0 through valid3. Control-logic tables used by the control-signal-generation unit 88 are shown in FIGS. 16A–16F through FIGS. 19A–19F. Namely, the multiplexer 62 of the registers R15 through R18 makes a selection according to entries provided in the field third from the left in a relevant table. Further, the multiplexers 50a through 50d make a selection according to entries provided in the field second from the left, and the multiplexers 53 through 56 make a selection according to entries provided in the field fourth from the left. Further, the rightmost field of any given FIGS. 16A–16F through FIGS. 19A–19F control-logic table shows a value of a pointer 90.

Figure 20:
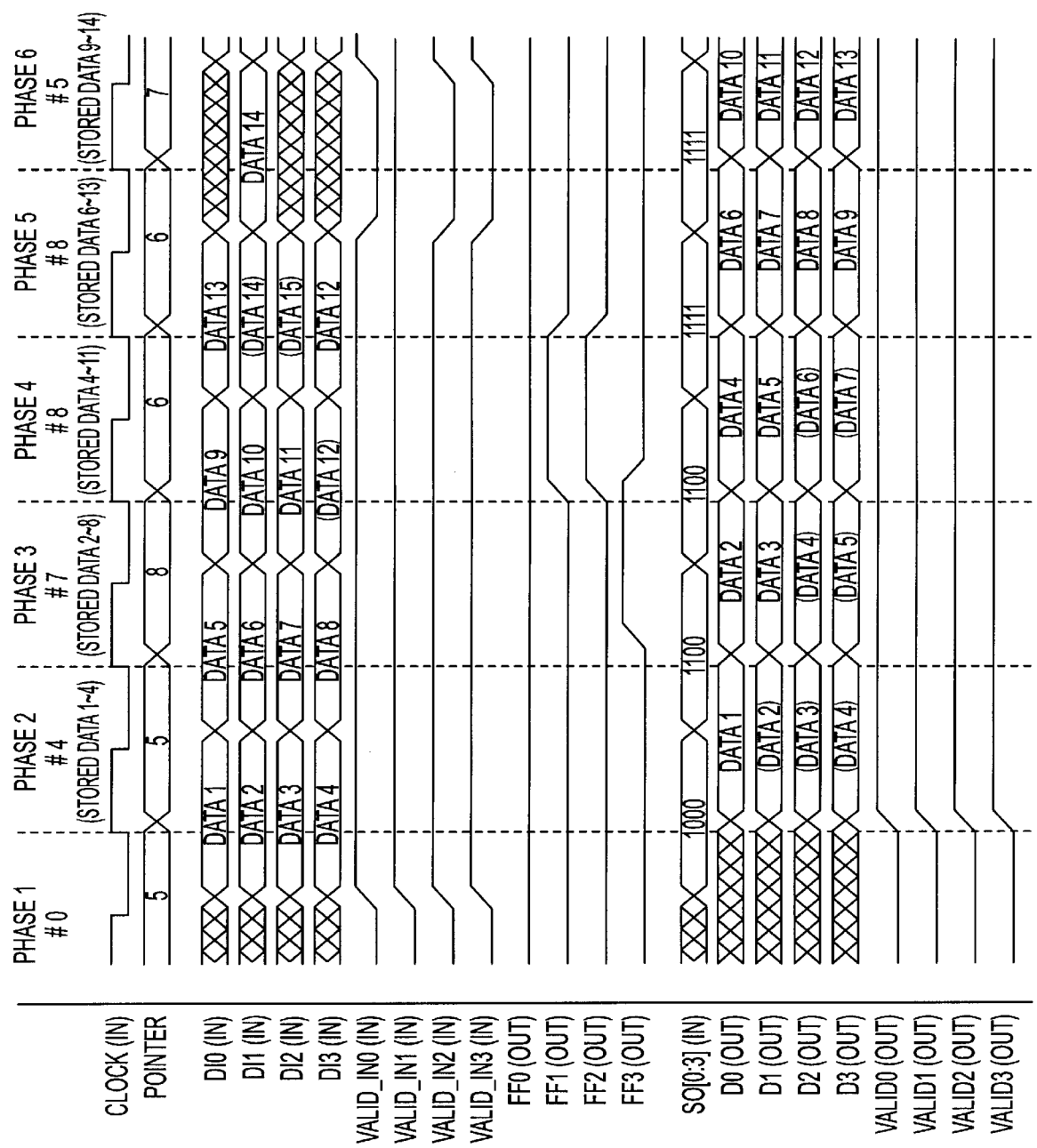
FIG. 20 is a timing chart for explaining operation of the FIFO circuit of the present invention.

Following describes the operation of the FIFO circuit of FIG. 14 with reference to the timing chart of FIG. 20.

As shown in a phase 1 of FIG. 20, initial settings are such that no valid data is held. In this, case, valid0 through valid3 are all zero, so that the control-logic table of the mode #0 shown in FIG. 16A will be selected. Further, the output-request number is 1 (SO=1000), so that the control circuit controls in accordance with the conditions set forth in the second row of the control-logic table of the mode #0. As a result, the pointer is set to 5.

At a rising edge of a clock signal clock after the valid-input-indication signals valid_in0 through valid_in3 become 1, instruction data (data 1 through 4) supplied to the input ports DI0 through DI3 are stored in the registers R5 through R8. The instruction data of the registers R5 through R8 are then supplied to the output ports D0 through D3, and the instruction data (data 1) is output from the output port D0 in accordance with the output-request number of 1. The selector circuit is always controlled in advance to select as many instruction data items as the output-request number. No instruction data is output from the output ports D1 through D3 during phase 1.

Then, the operation enters a phase 2 in response to a rising edge of the clock signal clock. Since the instruction data are stored in the registers R5 through R8, the control-logic table of the mode #4 (valid data positions: R5, R6, R7, and R8) shown in FIG. 16A is-referred to. With the output-request number being one (SO=1000), the second row of the table is selected. As is described in the second row, the contents of the registers R6 through R8 are moved to the registers R1 through R3, respectively. In the middle of phase 2, external conditions are changed, with the new conditions that the output-request number is 2 (SO=1100), and four instruction data items (data 5 through 8) are supplied as input data.

In response to a rising edge of the clock signal clock, the operation enters a phase 3. Since valid instruction data are stored in the registers R1, R2, R3, R5, R6, R7, and R8, the control-logic table of the mode #7 shown in FIG. 18C is referred to. With the output-request number being 2, the third row of the control-logic table of the mode #7 is consulted, so that the contents of the registers R1 and R2 are output from the output ports D0 and D1, respectively. Further, the data of the register R3 is moved to the register R1, and the data of the registers R5 through R7 are moved to the registers R2 through R4, respectively. The data in the register R8 stays therein. In this embodiment, a data-output order is determined according to the register numbers. Because of this limitation, when the register R5 receives next instruction data, the contents of the register R5 is regarded as having been input before the contents of the register R8. In order to avoid this, the pointer is changed to R8. In order to indicate that input to the input port DI3 is not acceptable when considering a need to prevent rewriting of the data of R8, the full flag FF3 being one is supplied to the exterior of the circuit. Moreover the AND circuit 49$d$ invalidates the valid-input-indication signal valid_in3.

In and after the phase 4, the number of data items stored in the eight registers is eight as long as the number of input data items does fall below the number of output data items. This insures an efficient use of the registers R1 through R8.

In this fifth embodiment, the pointer is used to indicate which one of the-registers R5 through R8 of the input register 18 stores a data item that needs to be output first. In the input register 18, data items are stored in the registers R5, R6, R7, and R8 in this order by following the order in which the data items are output. In order to maintain a correct order, all the data in the input register should be out by the time the next data is put in the register R5 after storing one round of data. Since the pointer indicates a data place where the data is to be output first, a correct order is maintained even if the next data is stored in the register R5 after one round of data storing. This achieves efficient use of the registers R1 through R8.

It should be noted that the register 34 corresponds to an intermediate register.

What is claimed is:

1. A FIFO circuit having a plurality of input ports permitting parallel access thereto and a plurality of output ports, comprising:

an input register coupled to said plurality of FIFO circuit input ports for storing therein data supplied from the plurality of FIFO circuit input ports;

a shifter coupled to said input register for rearranging the data supplied from said input register;

a shift register coupled to said shifter for storing and shifting the data supplied from said shifter;

a selector circuit coupled to said input register and to said shift register for selecting the data from one of said input register and said shift register, said selector circuit having a plurality of outputs forming said plurality of FIFO circuit output ports for providing output data; and a control circuit coupled to the foregoing for controlling the operation thereof.

2. The FIFO circuit as claimed in claim 1, wherein said output data provided at said plurality of FIFO circuit output ports begins from a least significant side thereof.

3. The FIFO circuit as claimed in claim 1, wherein said control circuit receives a requested number of input data items and a requested number of output data items from an exterior of said FIFO circuit.

4. The FIFO circuit as claimed in claim 1, wherein said control circuit provides a plurality of flag outputs to the exterior of said FIFO circuit for indicating the validity of the data of said plurality of FIFO circuit output ports.

5. A FIFO circuit having a plurality of input ports permitting parallel access thereto and a plurality of output ports, comprising:

an input register coupled to said plurality of FIFO circuit input ports for storing therein data supplied from the plurality of FIFO circuit input ports;

an intermediate register;

a multiplexer coupled to said intermediate register and to said input register for selecting the data supplied from one of said intermediate register and said input register, said multiplexer having an output coupled to an input of said intermediate register for providing data, said intermediate register storing therein the data supplied from said multiplexer and feeding back the stored data to said multiplexer;

a selector circuit coupled to said input register and to said intermediate register for selecting the data from one of said input register and said intermediate register, said selector circuit having a plurality of outputs forming said plurality of FIFO circuit output ports for providing output data; and a control circuit coupled to the foregoing for controlling the operation thereof.

6. The FIFO circuit as claimed in claim 5, wherein said output data provided at said plurality of FIFO circuit output ports begins from a least significant side thereof.

7. The FIFO circuit as claimed in claim 5, wherein said control circuit receives a requested number of input data items and a requested number of output data items from an exterior of said FIFO circuit.

8. The FIFO circuit as claimed in claim 5, wherein said control circuit receives an indication of valid data input and a requested number of output data items from an exterior of said FIFO circuit.

9. The FIFO circuit as claimed in claim 5, wherein said control circuit provides a plurality of flag outputs to the exterior of said FIFO circuit for indicating the validity of the output data of said plurality of FIFO circuit output ports.

10. A FIFO circuit having a plurality of input ports permitting parallel access thereto and a plurality of output ports, comprising:

an input register coupled to said plurality of FIFO circuit input ports for storing therein data supplied from the plurality of FIFO circuit input ports;

an intermediate register;

a multiplexer coupled to said plurality of FIFO circuit input ports, said intermediate register and to said input register for selecting the data supplied from one of said plurality of FIFO circuit input ports, said intermediate register and said input register, wherein said multiplexer having an output for supplying the selected data to said intermediate register beginning from a least significant side, said intermediate register storing therein the data supplied from said multiplexer and feeding back the stored data to said multiplexer;

a selector circuit coupled to said input register and to said intermediate register for selecting the data from one of said input register and said intermediate register, said selector circuit having a plurality of outputs forming said plurality of FIFO circuit output ports for providing output data; and a control circuit coupled to the foregoing for controlling the operation thereof.

11. The FIFO circuit as claimed in claim 10, wherein said output data provided at said plurality of FIFO circuit output ports begins from a least significant side thereof.

12. The FIFO circuit as claimed in claim 10, wherein said control circuit receives a requested number of input data items and a requested number of output data items from an exterior of said FIFO circuit.

13. The FIFO circuit as claimed in claim 10, wherein said control circuit receives an indication of valid data input and a requested number of output data items from an exterior of said FIFO circuit.

14. The FIFO circuit as claimed in claim 10, wherein said control circuit provides a plurality of flag outputs to the exterior of said FIFO circuit for indicating the validity of the output data of said plurality of FIFO circuit output ports.

15. The FIFO circuit as claimed in claim 10, wherein said control circuit further includes a pointer said pointer points to an input register, and is used to transfer data from the input register to an intermediate register ahead of any other input registers when this input register receives the data ahead of any other input registers.

16. A FIFO circuit having a plurality of input ports permitting parallel access thereto and a plurality of output ports, comprising:

a control circuit having a plurality of outputs for providing control signals;

an input register having a plurality of inputs respectively coupled to at least some of said plurality of input ports and an input register control input coupled to at least one of said control circuit outputs for receiving control signals, said input register storing therein information supplied from said plurality of input ports and having a plurality of outputs for providing output of such information responsive to said control signals received by it;

a shifter having a plurality of inputs respectively coupled to said plurality of input register outputs and a shifter control input coupled to at least one of said control circuit outputs for receiving control signals, said shifter rearranging the information provided from said input register and having a plurality of shifter outputs providing the rearranged information responsive to said control signals received by it;

a shift register having a plurality of inputs respectively coupled to said shifter outputs and a shift register control input coupled to at least one of said control circuit outputs for receiving control signals, said shift register storing and shifting therein the rearranged information and having a plurality of shift register outputs for providing shifted information responsive to the control signals received by it; and a selector circuit having a plurality of inputs respectively coupled to said plurality of outputs of said input register and a further plurality of inputs coupled to plurality of said shift register outputs and a selector circuit control input coupled to at least one of said control circuit outputs for receiving control signals, said selector circuit selecting the information from one output provided from said input register and the shifted information provided from one output from said shift register and having a plurality of outputs forming said plurality of FIFO circuit output ports for providing output information responsive to said control signals received by it; wherein the output information is provided at said FIFO circuit output ports beginning from a least significant side thereof.

17. The FIFO circuit as claimed in claim 16, said control circuit further comprises a plurality of inputs coupled to an exterior of said FIFO circuit wherein said control circuit provides control signals for a requested number of input data items and a requested number of output data items responsive said plurality of inputs of said control circuit.

18. The FIFO circuit as claimed in claim 16, wherein said control circuit is initialized by an external signal and controls said input register, said shifter, said shift register and said selector circuit in response to a plurality of inputs coupled to an exterior of said FIFO circuit and in response to the position of valid information within said input register, said shifter and said shift register.

* * * * *